United States Patent
Constable

(10) Patent No.: US 12,417,099 B2
(45) Date of Patent: Sep. 16, 2025

(54) CIRCUITRY AND METHODS FOR INFORMING INDIRECT PREFETCHES USING CAPABILITIES

(71) Applicant: Intel Corporation, Santa Clara, CA (US)

(72) Inventor: Scott D. Constable, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 17/712,073

(22) Filed: Apr. 2, 2022

(65) Prior Publication Data

US 2023/0315465 A1    Oct. 5, 2023

(51) Int. Cl.
*G06F 9/30* (2018.01)
(52) U.S. Cl.
CPC .. *G06F 9/30047* (2013.01); *G06F 2212/1052* (2013.01); *G06F 2212/6028* (2013.01)
(58) Field of Classification Search
CPC ............... G06F 9/3004; G06F 9/30043; G06F 9/30047; G06F 9/30145; G06F 9/35;
(Continued)

(56) References Cited

U.S. PATENT DOCUMENTS 3,916,385 A    10/1975 Parmar et al.
4,809,160 A    2/1989 Mahon et al.
(Continued)

FOREIGN PATENT DOCUMENTS

EP    0428079 A2    5/1991
EP    4198716 A1    6/2023
(Continued)

OTHER PUBLICATIONS

Advisory Action from U.S. Appl. No. 11/323,446, dated Apr. 17, 2012, 3 pages.
(Continued)

*Primary Examiner* — Andrew Caldwell
*Assistant Examiner* — Kasim Alli
(74) *Attorney, Agent, or Firm* — Nicholson De Vos Webster & Elliott LLP

(57) ABSTRACT

Systems, methods, and apparatuses for implementing capability-based indirect prefetching are described. In certain examples, a hardware processor comprises an execution circuit to execute an instruction that generates a memory access request for an element in memory via a first capability; a capability management circuit to check the first capability for the memory access request, the first capability comprising an address field of the element in the memory, a validity field, and a bounds field that is to indicate a lower bound and an upper bound of a first object to which the first capability authorizes access; a cache; and a prefetch circuit to: prefetch an additional element of the first object from the memory based on the first capability, determine if the additional element is a second capability comprising an address field of a second element in the memory, a validity field, and a bounds field that is to indicate a lower bound and an upper bound of a second object to which the second capability authorizes access, and prefetch the second element from the memory to the cache based on the additional element being the second capability.

24 Claims, 22 Drawing Sheets

(58) Field of Classification Search
CPC ...... G06F 9/383; G06F 9/468; G06F 12/0862; G06F 12/0875; G06F 12/1458; G06F 12/1483; G06F 12/1491; G06F 2212/1052; G06F 2212/452; G06F 2212/602; G06F 2212/6026; G06F 2212/6028; G06F 21/6209; G06F 21/6218; G06F 2221/2141

See application file for complete search history.

(56) References Cited

U.S. PATENT DOCUMENTS

| | | |
|---|---|---|
| 4,821,169 A | 4/1989 | Sites et al. |
| 5,809,564 A | 9/1998 | Craze et al. |
| 5,845,331 A | 12/1998 | Carter et al. |
| 5,860,150 A | 1/1999 | Chiarot et al. |
| 6,009,503 A | 12/1999 | Liedtke |
| 6,048,940 A | 4/2000 | Blaedel et al. |
| 6,247,107 B1* | 6/2001 | Christie ............ G06F 12/0862 711/216 |
| 6,671,699 B1 | 12/2003 | Black et al. |
| 6,694,450 B1 | 2/2004 | Kidder et al. |
| 6,823,433 B1 | 11/2004 | Barnes et al. |
| 7,401,234 B2 | 7/2008 | Case et al. |
| 7,948,496 B2 | 5/2011 | Hansen et al. |
| 8,356,143 B1 | 1/2013 | Bulusu et al. |
| 8,554,984 B2 | 10/2013 | Yano et al. |
| 8,595,442 B1 | 11/2013 | James-Roxby et al. |
| 8,850,573 B1 | 9/2014 | Chen et al. |
| 9,026,866 B2 | 5/2015 | Balasubramanian |
| 9,390,031 B2 | 7/2016 | Durham et al. |
| 9,436,847 B2 | 9/2016 | Durham et al. |
| 9,652,375 B2 | 5/2017 | Stark et al. |
| 9,734,084 B2 | 8/2017 | Bybell et al. |
| 10,162,694 B2 | 12/2018 | Stark et al. |
| 11,347,508 B2 | 5/2022 | Barnes |
| 2004/0031030 A1 | 2/2004 | Kidder et al. |
| 2004/0158775 A1 | 8/2004 | Shibuya et al. |
| 2005/0102294 A1* | 5/2005 | Coldewey ............ G06F 8/4442 |
| 2005/0193217 A1 | 9/2005 | Case et al. |
| 2006/0187941 A1 | 8/2006 | Andersen |
| 2006/0256877 A1 | 11/2006 | Szczepanek et al. |
| 2006/0256878 A1 | 11/2006 | Szczepanek et al. |
| 2006/0265552 A1 | 11/2006 | Davis et al. |
| 2007/0055837 A1 | 3/2007 | Rajagopal et al. |
| 2008/0209282 A1 | 8/2008 | Lee et al. |
| 2009/0271536 A1 | 10/2009 | Tiennot |
| 2009/0292977 A1 | 11/2009 | Bradley et al. |
| 2010/0162038 A1 | 6/2010 | Hulbert et al. |
| 2013/0254485 A1 | 9/2013 | Kannan et al. |
| 2013/0318322 A1 | 11/2013 | Shetty et al. |
| 2013/0326288 A1 | 12/2013 | Datta et al. |
| 2013/0339649 A1 | 12/2013 | Hsu et al. |
| 2014/0115283 A1 | 4/2014 | Radovic et al. |
| 2014/0281354 A1 | 9/2014 | Tkacik et al. |
| 2014/0372698 A1 | 12/2014 | Lee et al. |
| 2015/0134933 A1 | 5/2015 | Holm et al. |
| 2015/0199276 A1 | 7/2015 | Radhakrishnan et al. |
| 2016/0048378 A1 | 2/2016 | Varma |
| 2016/0124802 A1 | 5/2016 | Gabor et al. |
| 2016/0259682 A1 | 9/2016 | Stark et al. |
| 2016/0283300 A1 | 9/2016 | Stark et al. |
| 2016/0371139 A1 | 12/2016 | Stark et al. |
| 2017/0177429 A1 | 6/2017 | Stark et al. |
| 2018/0060250 A1 | 3/2018 | Hildesheim et al. |
| 2018/0074715 A1 | 3/2018 | Farmahini-Farahani et al. |
| 2020/0004953 A1 | 1/2020 | Lemay et al. |
| 2020/0042464 A1* | 2/2020 | Arulraj ............ G06F 12/1483 |
| 2020/0133863 A1* | 4/2020 | Pusdesris ............ G06F 12/0862 |
| 2021/0019148 A1* | 1/2021 | Caulfield ............ G06F 9/3455 |
| 2021/0081530 A1 | 3/2021 | O'Farrell |
| 2021/0200546 A1 | 7/2021 | Lemay et al. |
| 2021/0294607 A1 | 9/2021 | Abhishek Raja |
| 2023/0085143 A1 | 3/2023 | Smith |
| 2023/0195461 A1 | 6/2023 | Lemay et al. |
| 2023/0315452 A1 | 10/2023 | Constable |
| 2023/0315465 A1 | 10/2023 | Constable |
| 2023/0315640 A1 | 10/2023 | Constable |
| 2024/0411935 A1* | 12/2024 | Botman ............ G06F 9/30189 |
| 2025/0156182 A1* | 5/2025 | Botman ............ G06F 9/30036 |

FOREIGN PATENT DOCUMENTS

| | | |
|---|---|---|
| JP | 03-244054 A | 10/1991 |
| WO | 2007/079011 A3 | 11/2007 |

OTHER PUBLICATIONS

Angelo-Oracle. "SPARC M7 Chip—32 cores", Oracle.com, Aug. 15, 2014. Web. Accessed Dec. 21, 2015. 8 pages. URL: <http://blogs.oracle.com/rajadurai/entry/sparc_m7_chip_32_cores>.

Arm, "Arm® Architecture Reference Manual Supplement Morello for A-profile Architecture", Document No. DDI0606, Document Version: A.k, 2019-2022, 1294 pages.

Biin: "CPA Architecture Reference Manual", 1988, 401 pages.

Burow et al., "CUP: Comprehensive User-Space Protection for C/C++", Session 9: Software Security, ASIACCS'18, Jun. 4-8, 2018, pp. 381-392.

Carr et al., "DataShield: Configurable Data Confidentiality and Integrity", Asia CCS '17, Apr. 2-6, 2017, pp. 193-204.

Chen et al., "Shreds: Fine-grained Execution Units with Private Memory", IEEE Symposium on Security and Privacy, 2016, pp. 56-71.

Cheri, "Capability Hardware Enhanced RISC Instructions (CHERI)", available online at <https://www.cl.cam.ac.uk/research/security/ctsrd/cheri/>- , 2010-2019, 2 pages.

Dartmouth, "ELFbac: Runtime Intent-Level ABI-Granular Memory Protection for Linux", available online at <https://www.cs.dartmouth.edu/.about.sergey/io/elfbac,/>, retrieved on May 1, 2020, 1 page.

Duarte, "Memory Translation and Segmentation" Aug. 2008, p. 1-7.

Duck et al., "EffectiveSan: Type and Memory Error Detection using Dynamically Typed C/C++", PLDI'18, Jun. 18-22, 2018, pp. 181-195.

Final Office Action from U.S. Appl. No. 11/323,446, dated Dec. 30, 2011, 18 pages.

Final Office Action from U.S. Appl. No. 11/323,446, dated Jan. 17, 2013, 17 pages.

Final Office Action from U.S. Appl. No. 11/323,446, dated Jul. 16, 2015, 17 pages.

Final Office Action from U.S. Appl. No. 11/323,446, dated Jul. 28, 2014, 16 pages.

Final Office Action from U.S. Appl. No. 11/323,446, dated Jul. 7, 2009, 21 pages.

Final Office Action from U.S. Appl. No. 11/323,446, dated Oct. 15, 2010, 17 pages.

Final Office Action from U.S. Appl. No. 11/323,446, dated Sep. 20, 2013, 14 pages.

Gil et al., "There's a Hole in the Bottom of the C: On the Effectiveness of Allocation Protection", IEEE Cybersecurity Development (SecDev), Sep. 30-Oct. 2, 2018, 8 pages.

Gove, D., et al., "Detecting memory access errors," Nov. 25, 2015, 17 pages.

Gretton-Dann et al., "Arm A—Profile Architecture Developments 2018: Armv8.5-A", available online at <https://community.arm.com/developer/ip-products/processors/b/processo-rs-ip-blog/posts/arm-a-profile-architecture-2018-developments-armv85a>, Sep. 17, 2018, 5 pages.

https://courses.cs.washington.edu/courses/cse351/17wi/lectures/CSE351-L02-memory-I_17wi.pdf Author: Ceze; Title: CSE351: Memory, Data, & Addressing I, Date: Winter, 2017 (Year: 2017).

Intel, "Intel® 64 and IA-32 Architectures Software Developer's Manual, vol. 3A: System Programming Guide, Part 1", Order No. 253668-060US, Sep. 2016, 468 pages.

International Preliminary Report on Patentability for Application No. PCT/US2006/048940, dated Jul. 1, 2008, 8 pages.

International Search Report and Written Opinion for Application No. PCT/US2006/048940, dated Sep. 25, 2007, 15 pages.

(56) References Cited

OTHER PUBLICATIONS

International Search Report and Written Opinion for Application No. PCT/US2016/063211, dated Mar. 7, 2017, 11 pages.
Introduction to SPARC M7 and Silicon Secured Memory (SSM), Retrieved from https://swisdev.oracle.com/_files/What-Is-SSM.html on Apr. 7, 2016, 2 pages.
Kwon et al., "Low-Fat Pointers: Compact Encoding and Efficient Gate-Level Implementation of Fat Pointers for Spatial Safety and Capability-based Security", Proceedings of the 2013 ACM SIGSAC Conference on Computer & Communications Security, 2013, pp. 721-732.
Liljestrand et al., "PAC it up: Towards Pointer Integrity using ARM Pointer Authentication", Cornell University, Nov. 22, 2018, 21 pages.
LogMeIn Support, "What is Privilege Separation in SSH?", available online at <https://web.archive.org/web/20191218064501/https://help.logmein.co-m/articles/en_US/FAQ/What-is-Privilege-Separation-in-SSH-en1>, Dec. 18, 2019, 1 page.
M. Rutland, "ARMv8.3 Pointer Authentication",, Linux Security Summit, Sep. 14, 2017, 24 slides.
Mahon M.J., et al., "Hewlett-Packard Precision Architecture: The Processor," Hewlett-Packard Journal, Aug. 1986, 19 pages.
McIlroy et al., "Spectre is Here to Stay: An Analysis of Side-Channels and Speculative Execution", Cornell University, Feb. 15, 2019, pp. 1-26.
Menon et al., "Shakti-T: A RISC-V Processor with Light Weight Security Extensions", Conference: the Hardware and Architectural Support for Security and Privacy, Jun. 25, 2017, 9 pages.
Miller, Matt, "Trends, Challenges, and Strategic Shifts in the Software Vulnerability Mitigation Landscape", Microsoft Security Response Center (MSRC), Feb. 7, 2019, 32 pages.
Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.
Nagarakatte et al., "CETS: Compiler-Enforced Temporal Safety for C", ISMM 10, Jun. 5-6, 2010, pp. 31-40.
Non-Final Office Action from U.S. Appl. No. 11/323,446, dated Apr. 23, 2010, 16 pages.
Non-Final Office Action from U.S. Appl. No. 11/323,446, dated Jan. 15, 2015, 18 pages.
Non-Final Office Action from U.S. Appl. No. 11/323,446, dated Jun. 22, 2012, 16 pages.
Non-Final Office Action from U.S. Appl. No. 11/323,446, dated Jun. 7, 2013, 18 pages.
Non-Final Office Action from U.S. Appl. No. 11/323,446, dated Mar. 15, 2011, 16 pages.
Non-Final Office Action from U.S. Appl. No. 11/323,446, dated Mar. 20, 2014, 15 pages.
Non-Final Office Action from U.S. Appl. No. 11/323,446, dated Nov. 5, 2015, 5 pages.
Non-Final Office Action from U.S. Appl. No. 11/323,446, dated Oct. 7, 2008, 17 pages.
Notice of Allowance from U.S. Appl. No. 11/323,446, dated Mar. 14, 2016, 5 pages.
Osvik et al., "Cache Attacks and Countermeasures: the Case of AES (Extended Version)", Lecture Notes in Computer Science 2005, Nov. 20, 2005, 25 pages.
Qualcomm, "Pointer Authentication on ARMv8.3: Design and Analysis of the New Software Security Instructions", Jan. 2017, 12 pages.
Serebryany et al., "AddressSanitizer: A Fast Address Sanity Checker", 2012 Usenix Annual Technical Conference, Jun. 13-15, 2012, 10 pages.
Serebryany et al., "Memory Tagging and How It Improves C/C++ Memory Safety", Feb. 2018, 14 pages.
Serebryany et al., "Memory Tagging: How It Improves C/C++ Memory Safety" Google, LLVM Developers' Meeting, Oct. 2018, 29 slides.
Serebryany, Kostya, "Security: ARM Memory Tagging Extension and How It Improves C/C++ Memory Safety", vol. 44, No. 2, Summer 2019, pp. 12-16.
Suh et al., "Secure Program Execution via Dynamic Information Flow Tracking", ASPLOS'04, Oct. 9-13, 2004, pp. 85-96.
T. Nyman et al., "HardScope: Thwarting DOP attacks with Hardware-Assisted Run-time Scope Enforcement", May 2017, pp. 1-20.
The Chromium Projects, "Multi-Process Architecture", available online at <https://web.archive.org/web/20191030200549/https://www.chromium.org/d-evelopers/design-documents/multi-process-architecture>, Oct. 30, 2019, 2 pages.
Tsampas et al., "Towards Automatic Compartmentalization of C Programs on Capability Machines", In Proceedings of the International Conference on Foundations of Computer Science, 2017, 14 pages.
Vasilakis et al., "BreakApp: Automated, Flexible Application Compartmentalization", Network and Distributed Systems Security (NDSS) Symposium, Feb. 18-21, 2018, 15 pages.
Watson et al., "An Introduction to CHERI", University of Cambridge, Computer Laboratory, Technical Report, No. 941, Sep. 2019, 43 pages.
Watson et al., "Capability Hardware Enhanced RISC Instructions: (CHERI)", Department of Computer Science and Technology, University of Cambridge, Jan. 2022 (retrieved from https://www.cl.cam.ac.uk/research/security/ctsrd/cheri/ on Mar. 29, 2022), 3 pages.
Watson et al., "Capability Hardware Enhanced RISC Instructions: CHERI Instruction—Set Architecture (Version 8)", University of Cambridge, Computer Laboratory, Technical Report, No. 951, Oct. 2020, 590 pages.
Watson et al., "CHERI: A Hybrid Capability-System Architecture for Scalable Software Compartmentalization", IEEE Symposium on Security and Privacy, 2015, pp. 20-37.
Watson, "Capsicum: Practical capabilities for UNIX", USENIX Security, 2010, 17 pages.
Wesley et al., "Cornucopia: Temporal Safety for CHERI Heaps", In Proceedings of the 41st IEEE Symposium on Security and Privacy, 2020, pp. 1507-1524.
Wilkes J., et al., "A Comparison of Protection Lookaside Buffers and the PA-RISC Protection Architecture," Mar. 1992, Hewlett-Packard, 12 pages.
Xia et al., "CHERIvoke: Characterising Pointer Revocation using CHERI Capabilities for Temporal Memory Safety", Micro '52, Oct. 2019, pp. 545-557.
Yu et al., "IMP: Indirect Memory Prefetcher", 48th Annual IEEE/ACM International Symposium on Microarchitecture (MICRO), Dec. 5-9, 2015, 13 pages.
Non-Final Office Action, U.S. Appl. No. 17/712,072, May 12, 2025, 18 pages.
Non-Final Office Action, U.S. Appl. No. 17/712,075, Apr. 18, 2025, 9 pages.
Jeon et al., "HexType: Efficient Detection of Type Confusion Errors for C++", CCS '17, Session K3: Program Analysis, Oct. 2017, pp. 2373-2387.

* cited by examiner

CAPABILITY 110 → | VALIDITY TAG 110A | BOUNDS 110B | ADDRESS 110C (E.G., VIRTUAL ADDRESS) |

FIG. 2A

CAPABILITY 110 → | VALIDITY TAG 110A | PERM. 110D | OBJ. TYPE 110E | BOUNDS 110B | ADDRESS 110C (E.G., VIRTUAL ADDRESS) |

FIG. 2B

DATA STRUCTURE FOR CAPABILITY BASED PREFETCHING
134

| CAPABILITY INDEX 602 | MOST RECENT OFFSET ACCESSED 604 | MOST RECENT OFFSET PREFETCHED 606 | THREAD AND/OR LOGICAL PROCESSOR ID 608 | VALID AND/OR TIMEOUT AND/OR AGE BIT(S) 610 |
|---|---|---|---|---|
| 000 | 01101111 | | | |
| 001 | 00000000 | | | |
| 010 | 00000000 | | | |
| 011 | 00001000 | | | |
| 100 | 00000010 | | | |
| 101 | 00001100 | | | |
| 110 | 00000000 | | | |
| 111 | 10010000 | | | |

┌─────────────────────────────────────────────────────────────────────┐
   │   EXECUTING, BY AN EXECUTION CIRCUIT OF A PROCESSOR, AN INSTRUCTION THAT │
   │ GENERATES A MEMORY ACCESS REQUEST FOR AN ELEMENT IN MEMORY VIA A FIRST │
   │                              CAPABILITY                                │
   │                                 902                                    │
   └─────────────────────────────────────────────────────────────────────┘
                                    │
                                    ▼
   ┌─────────────────────────────────────────────────────────────────────┐
   │ CHECKING, BY A CAPABILITY MANAGEMENT CIRCUIT OF THE PROCESSOR, THE FIRST │
   │ CAPABILITY FOR THE MEMORY ACCESS REQUEST, THE FIRST CAPABILITY COMPRISING │
   │ AN ADDRESS FIELD OF THE ELEMENT IN THE MEMORY, A VALIDITY FIELD, AND A │
   │ BOUNDS FIELD THAT IS TO INDICATE A LOWER BOUND AND AN UPPER BOUND OF A │
   │    FIRST OBJECT TO WHICH THE FIRST CAPABILITY AUTHORIZES ACCESS       │
   │                                 904                                    │
   └─────────────────────────────────────────────────────────────────────┘
                                    │
                                    ▼
   ┌─────────────────────────────────────────────────────────────────────┐
   │ PREFETCHING, BY A PREFETCH CIRCUIT OF THE PROCESSOR, AN ADDITIONAL ELEMENT │
   │     OF THE FIRST OBJECT FROM THE MEMORY BASED ON THE FIRST CAPABILITY │
   │                                 906                                    │
   └─────────────────────────────────────────────────────────────────────┘
                                    │
                                    ▼
   ┌─────────────────────────────────────────────────────────────────────┐
   │   DETERMINING, BY THE PROCESSOR, IF THE ADDITIONAL ELEMENT IS A SECOND │
   │  CAPABILITY COMPRISING AN ADDRESS FIELD OF A SECOND ELEMENT IN THE MEMORY, │
   │ A VALIDITY FIELD, AND A BOUNDS FIELD THAT IS TO INDICATE A LOWER BOUND AND AN │
   │  UPPER BOUND OF A SECOND OBJECT TO WHICH THE SECOND CAPABILITY AUTHORIZES │
   │                                ACCESS                                  │
   │                                 908                                    │
   └─────────────────────────────────────────────────────────────────────┘
                                    │
                                    ▼
   ┌─────────────────────────────────────────────────────────────────────┐
   │  PREFETCHING, BY THE PREFETCH CIRCUIT, THE SECOND ELEMENT FROM THE MEMORY │
   │  TO A CACHE OF THE PROCESSOR BASED ON THE ADDITIONAL ELEMENT BEING THE │
   │                          SECOND CAPABILITY                             │
   │                                 910                                    │
   └─────────────────────────────────────────────────────────────────────┘
```

FIG. 9

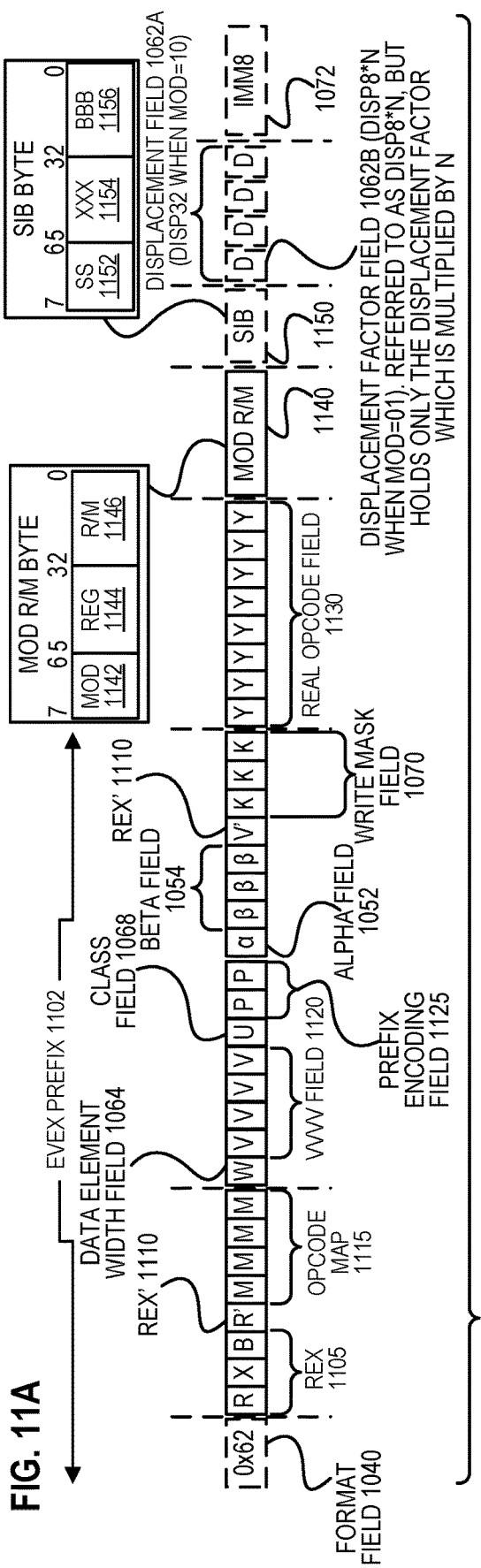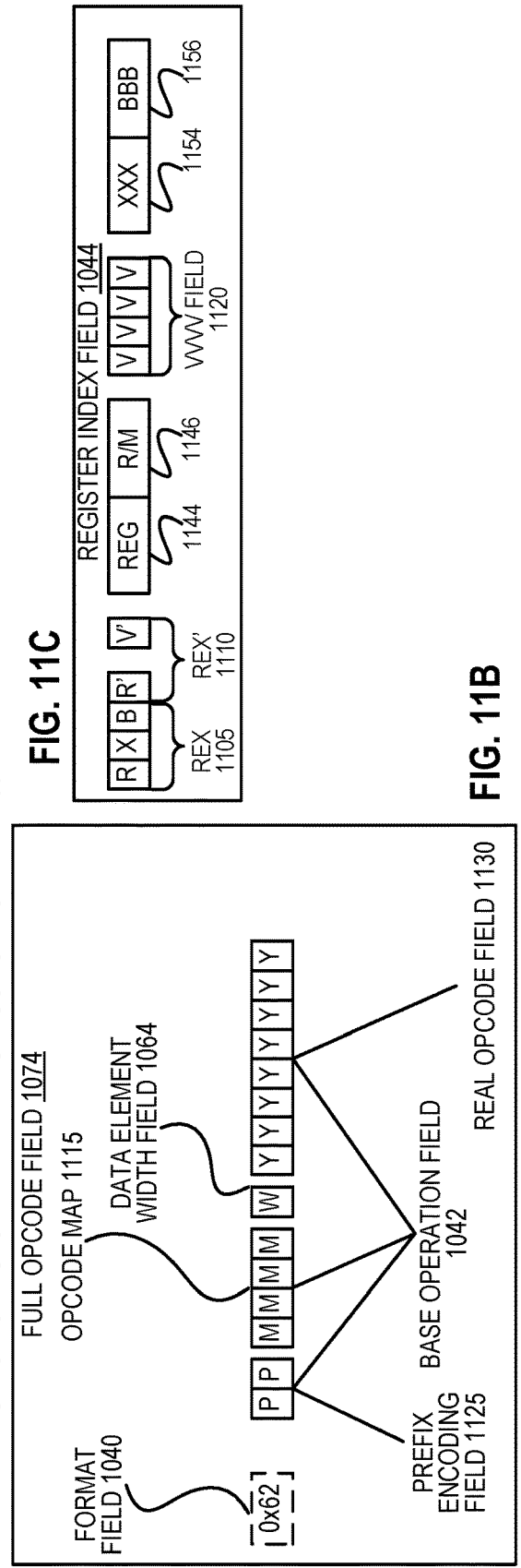

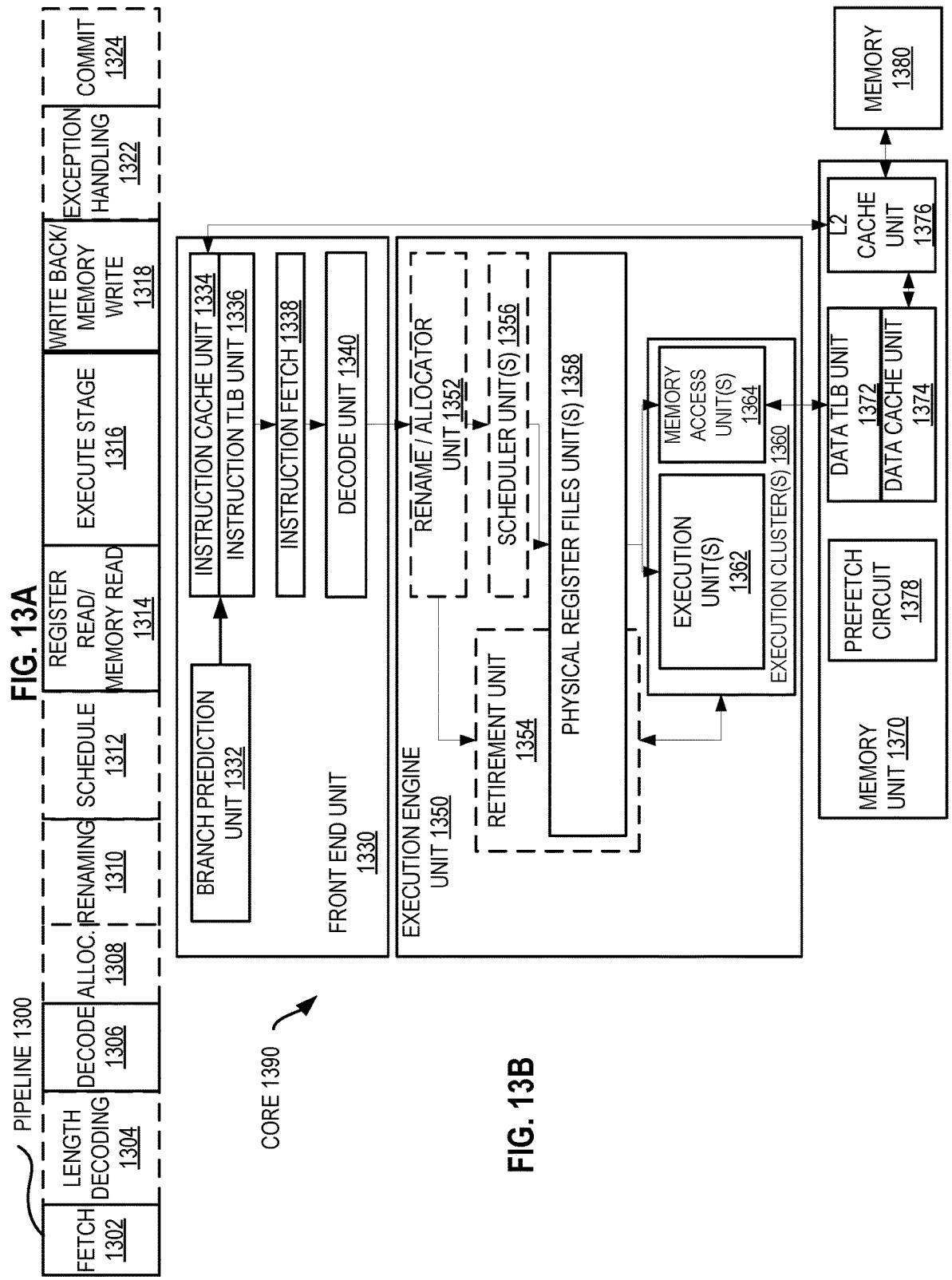

# CIRCUITRY AND METHODS FOR INFORMING INDIRECT PREFETCHES USING CAPABILITIES

TECHNICAL FIELD

The disclosure relates generally to electronics, and, more specifically, an example of the disclosure relates to circuitry for informing indirect prefetches using capabilities.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 2A illustrates an example format of a capability including a validity tag field, a bounds field, and an address field according to examples of the disclosure.

FIG. 2B illustrates an example format of a capability including a validity tag field, a permission field, an object type field, a bounds field, and an address field according to examples of the disclosure.

FIG. 6 illustrates an example format for a data structure for capability based prefetching according to examples of the disclosure.

FIG. 9 is a flow diagram illustrating operations of yet another method for indirect prefetching based on a capability according to examples of the disclosure.

FIG. 11A is a block diagram illustrating fields for the generic vector friendly instruction formats in FIGS. 10A and 10B according to examples of the disclosure.

FIG. 11B is a block diagram illustrating the fields of the specific vector friendly instruction format in FIG. 11A that make up a full opcode field according to one example of the disclosure.

FIG. 11C is a block diagram illustrating the fields of the specific vector friendly instruction format in FIG. 11A that make up a register index field according to one example of the disclosure.

FIG. 13A is a block diagram illustrating both an exemplary in-order pipeline and an exemplary register renaming, out-of-order issue/execution pipeline according to examples of the disclosure.

FIG. 13B is a block diagram illustrating both an exemplary example of an in-order architecture core and an exemplary register renaming, out-of-order issue/execution architecture core to be included in a processor according to examples of the disclosure.

DETAILED DESCRIPTION

Figure 1:
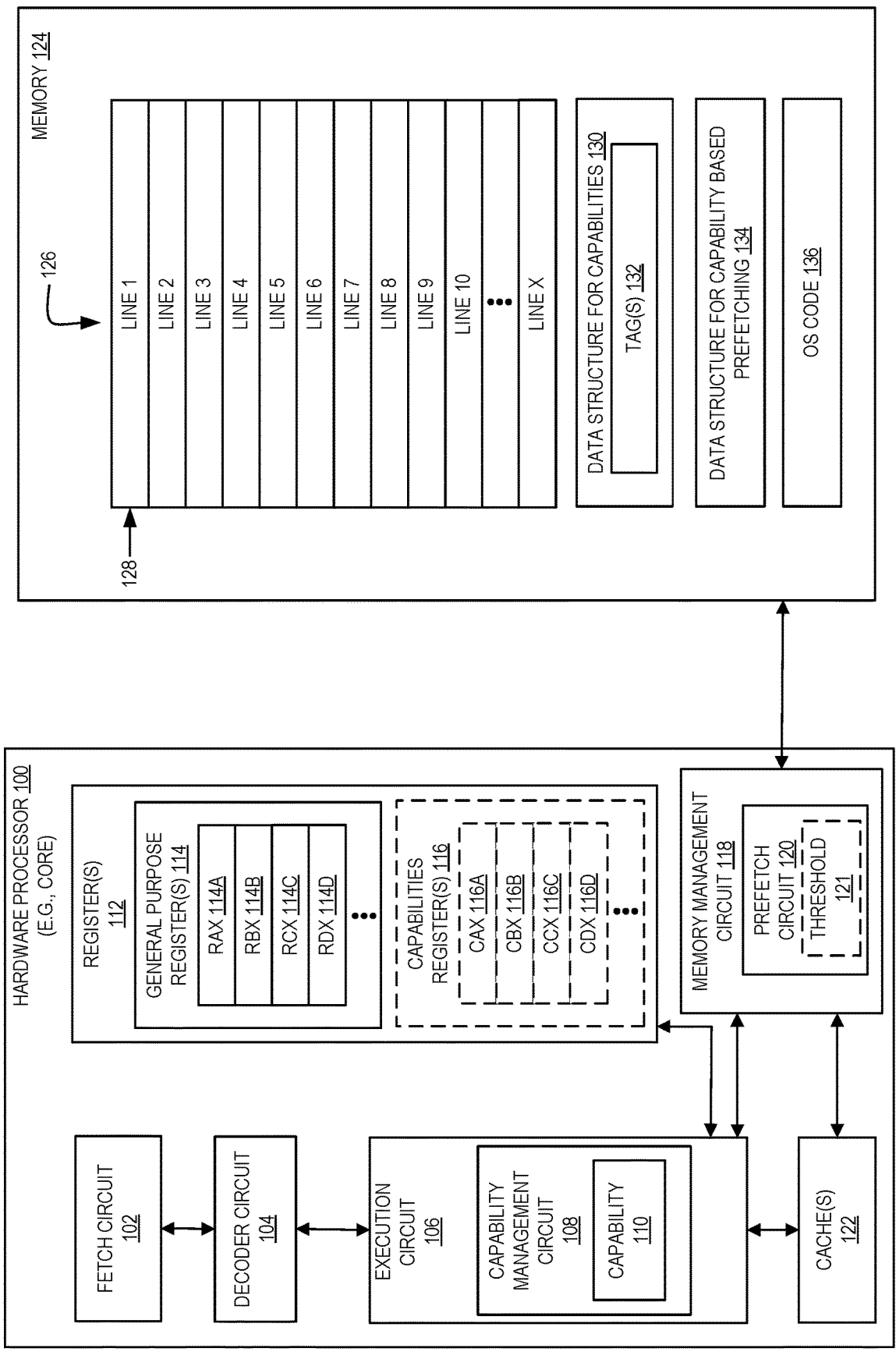
FIG. 1 illustrates a block diagram of a hardware processor, including a capability management circuit and a prefetch circuit, coupled to a memory according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Memory may be divided into separate blocks (e.g., one or more cache lines), for example, with each block managed as a single unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending memory (e.g., and register) addressing with an additional bit (e.g., writable only in supervisor mode) that indicates that a particular location is a capability, for example, such that all memory accesses (e.g., loads, stores, and/or instruction fetches) must be authorized by a respective capability or be denied. Example formats of capabilities are discussed below in reference to FIGS. 2A and 2B.

In certain examples, a processor uses a prefetcher (e.g., a hardware prefetch circuit) to prefetch data (e.g., program data and/or program instructions), for example, a prefetcher that predicts access addresses and brings the data for those addresses into a cache or caches, e.g., from memory, such as, but not limited to dynamic random access memory (DRAM). In certain examples, accessing memory remains a primary bottleneck to performance in a processor. Prefetching of data is a key technique to solve this problem. In certain examples, prefetching (e.g., hardware memory prefetching) is a performance optimization in which hardware attempts to predict which locations in memory (e.g., machine elements, cache lines, pages, etc.) are likely to be accessed in the near future. In certain examples, these locations are then fetched into a processor's (e.g., central processing unit's (CPU's)) caches, buffers, etc. so that any subsequent accesses will complete at a lower latency, e.g., the lower latency caused by a total time to access that data in the caches, buffers, etc. being (e.g., much) shorter than a total time to service a memory request for that data in the memory.

In certain examples, the prefetcher (e.g., prefetch circuit) lacks high-level semantic information about data structures and program behavior and is to perform guesswork to determine the best candidates for prefetching. If the prefetcher (e.g., prefetch circuit) guesses incorrectly, then frequently accessed (e.g., "hot") data may be displaced and/or evicted from the cache(s) (e.g., buffers, etc.), which can negatively impact performance. If the prefetcher (e.g., prefetch circuit) is too conservative, then opportunities for performance optimization may be missed. To improve the likelihood of true positives and minimize the likelihood of false positives, a prefetcher (e.g., prefetch circuit) may use heuristics that attempt to recognize access patterns exhibited by common design patterns, algorithms, and data structures.

In certain examples, one data structure that may be frequently encountered is a contiguous array of homogeneous elements, for example, where a design pattern (e.g., the iterator pattern) accesses each element of the array in sequence. In certain examples, the iterator searches for an element, aggregates data, and/or modifies one or more of the array elements. Certain hardware prefetchers include built-in heuristics to detect the iterator pattern, e.g., a sequence of memory accesses at a same stride. For example, if the prefetcher (e.g., prefetch circuit) observes that some location X (e.g., a memory address) is accessed, and then a location at X+N bytes is accessed, and then a location at X+2N bytes is accessed, the prefetcher may guess that locations at X+3N, X+4N, X+5N, etc. may be accessed, and may prefetch some (or all) of those locations (e.g., the data at those locations) from memory. However, like all heuristics, this kind of heuristic has limited accuracy. It may not be able to recognize the access pattern if the array is too small (thus, fewer true positives), or it may aggressively prefetch well beyond the end of the array (thus, more false positives).

In certain examples, if the data being prefetched is a pointer to memory or capability to memory, then the pointer or capability can also be used (i) to access the data referenced (e.g., the address referenced) by the pointer or capability (e.g., where the data is data located elsewhere in memory) and/or (ii) to invoke a virtual method on a polymorphic data type, e.g., an object in certain (e.g., C++) programming languages. In certain examples, a hardware prefetcher (e.g., prefetch circuit) pattern-matches the special case where array iteration is used to dereference pointers within the array, and then predicts that future accesses (e.g., at a determined stride) within the array will similarly dereference pointers. Hence, certain prefetchers may not only prefetch memory locations ahead of the iterator, but may also interpret data within those memory locations as pointers and further prefetch data at the corresponding addresses. In certain examples, this behavior is referred to as an "indirect prefetch" (e.g., even if the "pointer" is an improved pointer in the format of a capability).

In certain examples (e.g., certain processors), the stored bits (e.g., data) may be actual data (e.g., data to be operated on) or a pointer (e.g., an address to already-stored data), but the hardware itself cannot discern between the data and a pointer. Certain examples herein (e.g., certain prefetchers) utilize a hardware (e.g., capability-aware processor) recognized capability (e.g., according to the capability format(s) disclosed herein) to indicate that a value is a capability that points to an address, e.g., such that data stored at the address is prefetched.

Certain instruction set architecture (ISA) designs cause more semantic information to become exposed to hardware. One example is where bounds-checked pointers (e.g., capabilities) are a primitive datatype recognized by the processor (e.g., CPU). Thus, in certain examples, the hardware knows when an element (for example, a single element being a certain (e.g., same) size, e.g., 64 bits) in memory corresponds to a capability, and moreover the hardware also knows the memory bounds (e.g., as a field from the capability) within which the capability is allowed to access. Examples herein utilize one or more of the properties of the capability data type (or any similar technology of other architectures, such as, but not limited to, Intel® Memory Protection Extensions (MPX)) to improve the accuracy of hardware prefetching.

Examples herein improve the accuracy of hardware prefetchers (e.g., prefetch circuits) (e.g., hardware prefetchers that use array-stride detection heuristics) in processors that use a capability-based addressing scheme by also utilizing a capability (e.g., the bounds thereof) to control prefetching of data referenced by the capability, for example, without (or with) adding any additional (e.g., prefetch) field to a format of the capability. Examples herein improve the accuracy of hardware prefetchers (e.g., prefetch circuits) (e.g., hardware prefetchers that use array-stride detection heuristics) in processors that use a hardware implemented capability (e.g., where the capability is provided to a program and/or function by the OS) for obtaining access to a capability protected object via a capability management circuit of the processor by extending the use of the capability (e.g., the bounds thereof) to also control prefetching of data referenced by the capability by a prefetch circuit (e.g., the prefetch circuit separate from the capability management circuit) for example, without (or with) adding any additional (e.g., prefetch) field to a format of the capability. Certain examples herein simplify the hardware that is used to implement a prefetcher (e.g., prefetch circuit) by using capabilities to control prefetching of data referenced by the capability. Examples herein thus provide increased performance and security for a prefetcher (e.g., prefetch circuit), for example, by the microarchitectural innovations disclosed herein that apply a novel performance optimization to an architectural security primitive (e.g., a "capability").

Examples herein are improvements to the functioning of a processor (e.g., of a computer) itself because they allow a prefetch circuit to utilize a capability (e.g., the bounds thereof) to control prefetching of data referenced by the capability, e.g., where the capability was also prefetched. Examples herein are improvements to the functioning of a processor (e.g., of a computer) itself because they extend the use of a capability (e.g., the hardware enforced bounds thereof) to also control prefetching of data referenced (e.g., bounded) by the (e.g., prefetched) capability by a prefetch circuit. Examples herein allow a prefetch circuit to securely prefetch data under the assumption that a particular (e.g., prefetched) value in memory corresponds to an address pointing elsewhere in memory. Examples herein allow a prefetch circuit to use tagged capabilities (e.g., bounded pointers, "fat" pointers, etc.) to reduce the frequency of false positives, e.g., when performing indirect prefetching on an array, and thus improve performance (e.g., improves the number of instructions per cycle (or clock) (IPC) achieved).

Figure 7:
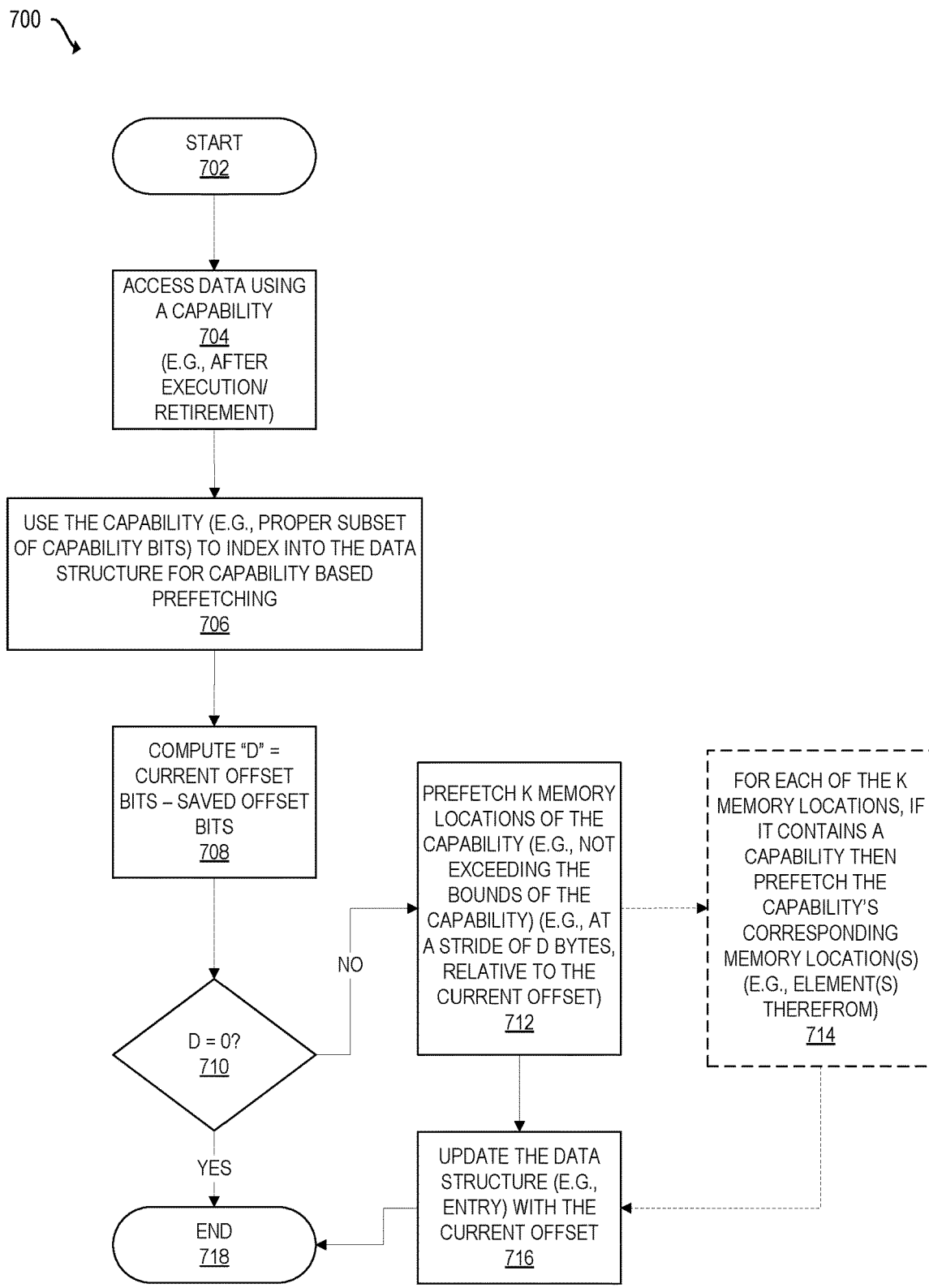
FIG. 7 is a flow diagram illustrating operations of a method for indirect prefetching based on a capability according to examples of the disclosure.

In certain examples (e.g., to reduce the frequency of indirect prefetch false positives during array iteration), a prefetch circuit (and/or prefetch methods) includes (1) augmenting "indirect prefetch" hardware to use memory bounds information encoded in capabilities (e.g., discussed in reference to FIG. 8) and/or (2) supporting capability-informed "indirect prefetching" during array iteration (e.g., discussed in reference to FIG. 7).

Turning now to the Figures, FIG. 1 illustrates a block diagram of a hardware processor 100 (e.g., core), including a capability management circuit 108 and a prefetch circuit 120, coupled to a memory 124 according to examples of the disclosure. Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100. Although the prefetch circuit 120 is depicted within the memory management circuit 118, it should be understood that the prefetch circuit 120 can be located elsewhere, for example, in another component of hardware processor 100 (for example, within cache(s) 122, e.g., a cache controller thereof) or separate from the depicted components of hardware processor 100.

Depicted hardware processor 100 includes a hardware fetch circuit 102 to fetch an instruction (e.g., from memory 124), e.g., an instruction that is to request access to a block (or blocks) of memory through a (e.g., non-capability) pointer and/or an instruction that is to request access to a block (or blocks) of memory 124 through a capability 110 to the block (or blocks) of the memory 124. Depicted hardware processor 100 includes a hardware decoder circuit 104 to decode an instruction, e.g., an instruction that is to request access to a block (or blocks) of memory through a (e.g., non-capability) pointer and/or an instruction that is to request access to a block (or blocks) of memory 124 through a capability 110 to the block (or blocks) of the memory 124. In certain examples, an instruction is according to a format discussed herein, e.g., in FIGS. 10A-11D. Depicted hardware execution circuit 106 is to execute the decoded instruction, e.g., an instruction that is to request access to a block (or blocks) of memory through a (e.g., non-capability) pointer and/or an instruction that is to request access to a block (or blocks) of memory 124 through a capability 110 to the block (or blocks) of the memory 124. In certain examples, the execution circuit 106 is to access data in one or more caches (for example, one or more levels of a multiple level cache, e.g., as discussed further in reference to FIG. 3) and/or in the memory 124 (e.g., memory separate from any cache and/or the processor die).

In certain examples, capability management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction, is to allow access to memory 124 storing (1) another capability and/or (2) data and/or instructions (e.g., an object) protected by a capability, and/or (ii) if a non-capability instruction, is not to allow access to memory 124 storing (1) another capability and/or (2) data and/or instructions (e.g., an object) protected by a capability. In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., is to set and/or clear validity tags. In certain examples, capability management circuit 108 is to clear the validity tag of a capability in a register in response to that register being written to by a non-capability instruction.

In certain examples, the source storage location in memory 124 (e.g., virtual address) for a capability 110 is an operand of an (e.g., supervisor level) instruction (e.g., having a mnemonic of LoadCap) that is to load the capability from the memory 124 into register(s) 112 (e.g., into one or more of capability registers 116). In certain examples, the destination storage location in memory 124 (e.g., virtual address) for a capability 110 is an operand of an (e.g., supervisor level) instruction (e.g., having a mnemonic of StoreCap) that is to store the capability from the register(s) 112 into memory 124. In certain examples, the instruction is requested for execution by executing OS code 136 (e.g., or some other privileged process authorized to do so).

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) language memory safety and compartmentalization.

In certain examples, the capability incudes an address for data (e.g., instructions and/or data to be operated on by instructions) stored in a single line of memory 124. In certain examples, the capability incudes an address for data (e.g., instructions and/or data to be operated on by instructions) stored in multiple lines of memory 124. For example, a block of memory may be lines 1 and 2 of data of the (e.g., physical) addressable memory 126 of memory 124 having an address 128 to one (e.g., the first) line (e.g., line 1). In certain examples, a capability includes upper and/or lower bounds of an object protected by a capability, for example, with the address in the capability indicating a single element of multiple elements of a single object (e.g., an array) protected by the capability. Certain examples have a memory of a total size X, where X is any positive integer.

A capability may have different formats and/or fields. In certain examples, a capability is more than twice the width of a native (e.g., integer) pointer type of the baseline architecture, for example, 129-bit capabilities (e.g., including the validity tag) on 64-bit platforms, and 65-bit (e.g., including the validity tag) capabilities on 32-bit platforms. In certain examples, each capability includes an (e.g., integer) address of the natural size for the architecture (e.g., 32 or 64 bit) and also additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by capability management circuit 108). In certain examples, each element of the capability contributes to the protection model and is enforced by hardware (e.g., capability management circuit 108).

In certain examples, capabilities (e.g., one or more fields thereof) themselves are also stored in memory 124, for example, in data structure 130 (e.g., table) for capabilities. In certain examples, a (e.g., validity) tag 132 is stored in data structure 130 for a capability stored in memory. In certain examples, tags 132 (e.g., in data structure 130) are not accessible by non-capability (e.g., load and/or store) instructions. In certain examples, a (e.g., validity) tag is stored along with the capability stored in memory (e.g., in one contiguous block).

In certain examples, capability management circuit 108 uses capability-based access control for enforcing memory safety, e.g., and low-overhead compartmentalization (e.g., of objects).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated only for capabilities) capabilities register(s) 116 (e.g., registers CAX 116A, CBX 116B, CCX 116C, CDX 116D, etc.).

In certain examples, an indication (e.g., name) of the destination register for capability 110 in register(s) 112 is an operand of an (e.g., supervisor level) instruction (e.g., having a mnemonic of LoadCap) that is to load the capability from the memory 124 into register(s) 112. In certain examples, an indication (e.g., name) of the source register for capability 110 in register(s) 112 is an operand of an (e.g., supervisor level) instruction (e.g., having a mnemonic of StoreCap) that is to store the capability from the register(s) 112 into memory 124.

Hardware processor 100 includes a coupling (e.g., connection) to memory 124. In certain examples, memory 124 is a memory local to the hardware processor (e.g., system memory). In certain examples, memory 124 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In certain examples, hardware processor 100 includes a memory management circuit 118, for example, to control access (e.g., by the execution unit 106) to the (e.g., addressable memory 126 of) memory 124.

As discussed above, in certain examples the execution circuit 106 is to access data in the memory 124 (e.g., memory separate from any cache(s) 122). However, it may be desirable for prefetch circuit 120 to prefetch certain data from the memory 124 into storage (e.g., cache(s) 122, registers 112 (e.g., including capabilities register(s) 116), etc.)) within the processor 100, e.g., to decrease the time (e.g., waiting) for a memory access request to be serviced in memory 124 by the memory management circuit 118 in comparison to the time to access the storage within the processor (e.g., the cache(s) 122).

In certain examples, processor 100 (e.g., core) uses a prefetcher (e.g., prefetch circuit 120) to predict an access (e.g., one or more access addresses) and prefetch (e.g., bring) the data for those one or more addresses into a cache or caches 122 (e.g., data stored in memory 124, such as, but not limited to dynamic random access memory (DRAM)). In certain examples, one or more prefetch thresholds 121 are indicated for prefetch circuit 120, for example, a threshold number of accesses to an object (e.g., via a capability) to occur before prefetching data for that object from memory into one or more caches.

In certain examples, processor 100 utilizes capability 110 for access control of data (e.g., protected objects). Examples herein utilize the capability 110 as an input into prefetch circuit 120, e.g., to prefetch data from memory 124 into cache(s) 122 based at least in part on the capability. Further discussion of this is in reference to FIGS. 4-7. In certain examples, the one or more elements in memory 124 determined as candidate(s) for prefetching (e.g., into cache(s) 122) by the prefetch circuit 120 based on an input of a capability are granted corresponding access in the memory 124 for the prefetching by the capability management circuit 108, e.g., such that prefetching of those element(s) is allowed even though the element(s) are protected by the (e.g., same) capability. In certain examples, the prefetch circuit 120 sends a value to the capability management circuit 108 to indicate which capability that the prefetch corresponds to so that the capability management circuit 108 allows access to the element(s) (e.g., data) protected by that same capability, e.g., to keep the prefetch circuit 120 from allowing prefetch access to element(s) (e.g., data) protected by a different capability.

In certain examples, the prefetching techniques discussed herein are implemented (e.g., entirely) in the frontend of a processor (e.g., with the fetch circuit 102 and decoder circuit 104) (e.g., before the execution circuit).

In certain examples (e.g., where the prefetch circuit 120 is proximal to the capability management circuit 108), the capability management circuit 108 is to send information about a load using a capability (e.g., where this differs from a load of a capability itself) to prefetch circuit 120 and this information would become an input to the prefetching discussed herein (e.g., the operations shown in FIG. 7).

In certain examples, the decoder circuit 104 decodes an instruction (e.g., an instruction for a load operation using a capability) into additional "load hint" micro-operation(s) that have the (e.g., physical) load address and capability (e.g., capability bounds) as operands. In certain examples, processor 100 uses load hint micro-operations, but instead of only using the physical address, the load hint micro-operations(s) and are extended to additionally encode the capability (e.g., capability bounds). In certain of these examples, the prefetch circuit 120 does not necessarily need to play a role, e.g., it would depend on how a given processor executes these load hint micro-ops.

In certain examples, processor 100 (e.g., core) uses a prefetcher (e.g., prefetch circuit 120) to, for prefetched data, further prefetch any data referenced by a capability in the prefetched data (e.g., where the further data that is to be prefetched is also stored at a memory address in memory 124) into the processor 100 (for example, a core, e.g., a cache or caches 122 thereof). In certain examples, a capability (for example, according to one or more of the format(s) discussed herein, e.g., in FIGS. 2A-2B) is prefetched into processor 100 (e.g., prefetch circuit 120 and/or cache(s) 122) and, in response to the hardware (e.g., capability management circuit 108) detecting the prefetched item is a capability (e.g., that points to other data), the prefetch circuit is to issue an additional memory request (or requests) for the one or more further elements based on that prefetched capability (e.g., the one or more further elements protected by that prefetched capability). In certain examples, the hardware (e.g., capability management circuit 108) detects that prefetched data is a capability by looking up if that prefetched data is associated with (e.g., includes) a (e.g., set) validity tag. In certain examples, the look-up of a validity tag depends on a processor's implementation of tags, e.g., where certain processors utilize tag controller(s) and tag cache(s). In certain examples, a processor reserves a contiguous segment within each data cache (e.g., L1-L3 caches in FIG. 3) to store validity tags. In certain examples, the $i^{th}$ (e.g., 128-bit) data entry in the data cache has a corresponding validity bit at the $i^{th}$ offset within the aforementioned reserved contiguous segment, such that when this bit is set, then the processor deduces that the $i^{th}$ data entry is a valid capability.

In certain examples, processor 100 (e.g., prefetch circuit 120) utilizes data structure 134 for capability based prefetching. An example of the data structure 134 is discussed herein in reference to FIG. 6.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, the format of a capability (for example, as a pointer that has been extended with security metadata, e.g., bounds, permissions, and/or type information) is the same bit width (other than the validity tag) as a native pointer, e.g., a capability having a (e.g., 64-bit) address (e.g., pointer) combined with bounds information and/or other metadata that can be used for enforcing other fine-grained access control policies. In certain examples, a capability includes a (e.g., 1-bit) validity tag that is guarded within processor-protected (e.g., "out of band") memory, for example, such that this tag serves as a (e.g., tamper-proof) type indicator that indicates that a given value in memory is a capability (e.g., in contrast with that value being data or a non-capability pointer).

Figure 3:
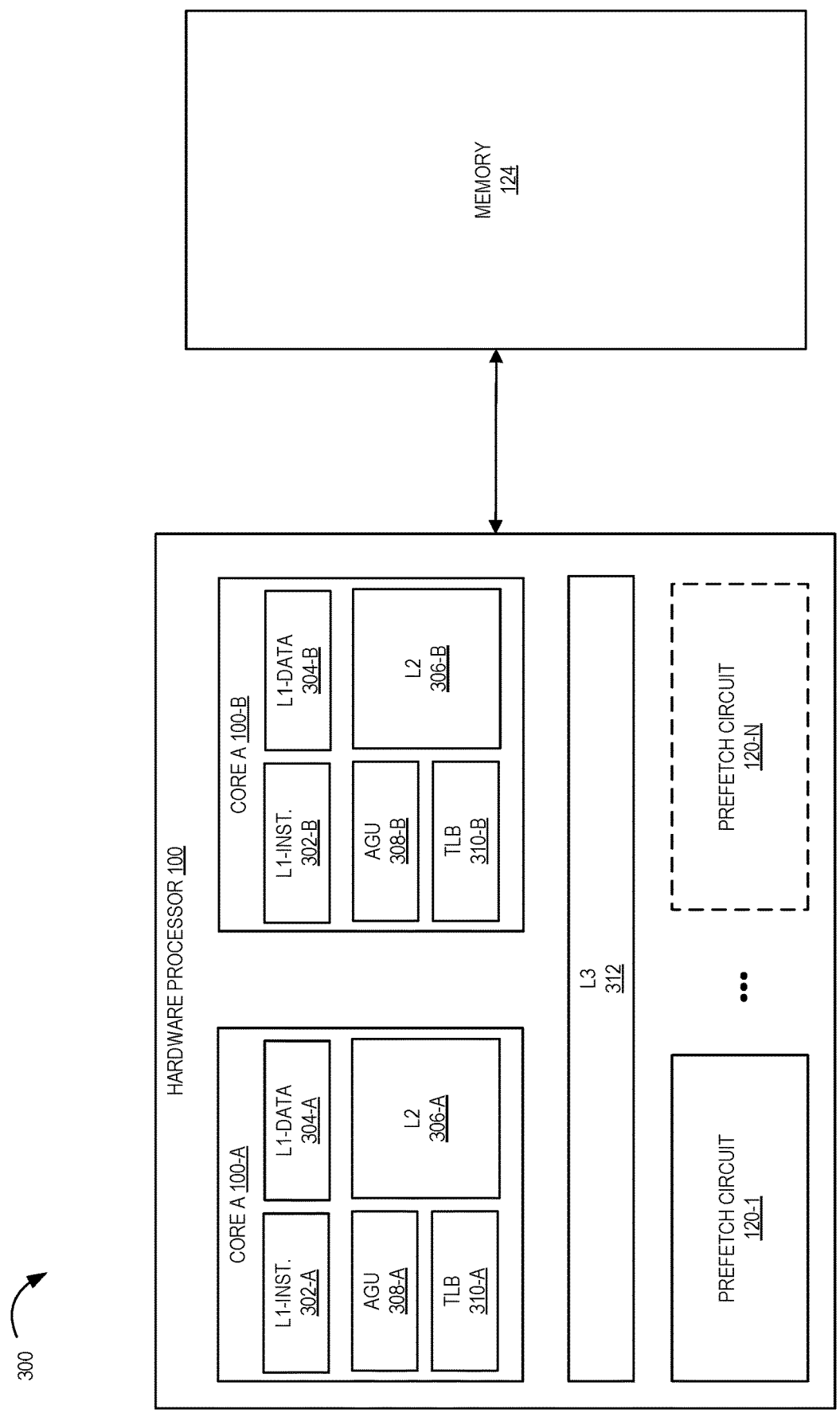
FIG. 3 illustrates a block diagram of a system comprising a hardware processor, including a plurality of cache levels and a prefetch circuit, coupled to a memory according to examples of the disclosure.

FIG. 3 illustrates a block diagram of a system 300 comprising a hardware processor 100, including a plurality of cache levels and a prefetch circuit 120, coupled to a memory 124 according to examples of the disclosure.

A processor may include a prefetch circuit, e.g., the processors discussed below. FIG. 3 illustrates an example of multiple processor cores (core A 100-A and core B 100-B) and multiple levels of caches (e.g., L1, L2, and L3), e.g., in a cache coherency hierarchy. Although two cores are depicted, a single or more than two cores may be utilized. Although multiple levels of cache are depicted, a single, or any number of caches may be utilized. Cache(s) may be organized in any fashion, for example, as a physically or logically centralized or distributed cache.

In an example, a processor 100, such as a processor or processors including the processor cores illustrated in the Figures, or any other processor, may include one or more caches. FIG. 3 illustrates an example of a three level (e.g., levels 1 (L1), 2 (L2), and 3 (L3)/last level cache (LLC)) cache hierarchy. In certain examples, multiple cores (core A 100-A and B 100-B) are of a single processor 100. A core (e.g., core A and core B) may include the components of a processor to execute instructions. An un-core may include all logic circuitry not in a core. A processor core (e.g., core A) may include components such as a level 1 instruction cache (L1-INST.) 302 and a level 1 data cache (L1-DATA) 304. A core may include components such as an address generation unit (AGU) 308, translation lookaside buffer (TLB) 310, and a level 2 cache (L2) 306. A core may or may not share a cache with other cores, for example, core A and core B may share some level(s) of cache and not share other level(s) of cache, e.g., core A and core B may share the level 3 cache (L3) 312 but not their L2 306 or L1 (302,304) caches. A core may include any combination of these components or none of these components. Processor 100 (e.g., core A and core B) may access (e.g., load and store) data in the (e.g., system) memory 124, e.g., as indicated by the arrow. In one example, the (e.g., system) memory 124 communicates with the core over a bus and/or interconnect, e.g., at a slower access and/or cycle time than the core accessing cache (e.g., cache on the processor 100).

An address generation unit (e.g., AGU 308), for example, address computation unit (ACU), may refer to a circuit inside a processor (e.g., a core) that calculates addresses used to access memory (e.g., system memory), for example, to allow the core to access the system memory. In one example, the AGU takes data values (e.g., register value and addresses mentioned in an instruction) as an input and outputs the (e.g., virtual) addresses for that stream. A core may include an execution circuit (e.g., execution unit) to perform arithmetic operations, such as addition, subtraction, modulo operations, or bit shifts, for example, utilizing an adder, multiplier, shifter, rotator, etc. thereof.

A translation lookaside buffer (e.g., TLB 310) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

Prefetch circuit 120 (for example, one or more parallel instances of prefetch circuits 120-1 to 120-N, e.g., where N is any positive integer greater than one) may be a separate functional circuit, for example, not utilizing a functional circuit (e.g., execution circuit (e.g., Arithmetic Logic Unit (ALU)), AGU, TLB, etc.) of a core. Prefetch circuit may be part of a processor (e.g., but separate from a core(s)). Prefetch circuit may communicate with the core(s) of the processor, e.g., via communication resources, such as, but not limited to, a ring network. Processor 100 may communicate with the (e.g., system) memory 124 and/or caches (e.g., L1, L2, or L3 in FIG. 1) via a memory controller (e.g., as part of the processor) and/or an interconnect. Prefetch circuit 120 may output the system memory addresses to a memory controller (e.g., memory management circuit 118 in FIG. 1 or memory unit 1370 in FIG. 13B) of processor 100. In certain examples, each of core A 100-A and core B 100-B includes execution circuitry, e.g., one or more (e.g., a plurality of) execution circuits (e.g., as instance(s) of execution circuit 106 in FIG. 1).

In certain examples, prefetch circuit 120 includes circuitry (e.g., hardware logic circuitry) to perform the prefetching (e.g., indirect prefetching) discussed herein, e.g., based on a capability.

In certain examples, prefetching based on a capability is utilized for one or more of certain categories of (for example, (e.g., logically) contiguous) data structures in memory.

Figure 4:
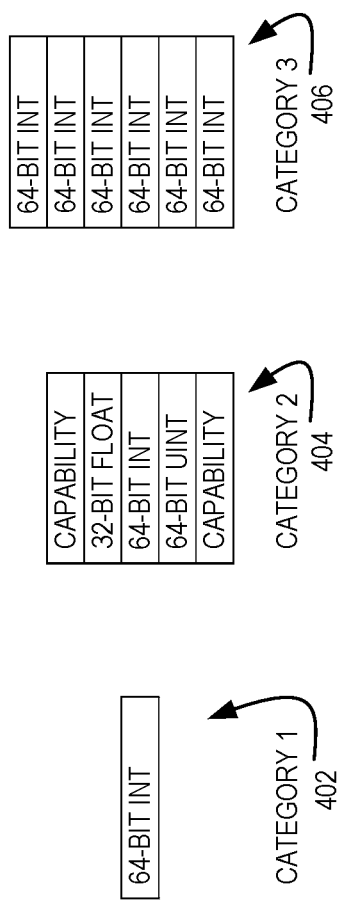
FIG. 4 illustrates three categories of data structures in memory according to examples of the disclosure.

FIG. 4 illustrates three categories (402, 404, and 406) of data structures in memory according to examples of the disclosure. In certain examples, a first category 402 is a single (e.g., machine) element of a primitive type, for example, (e.g., signed (S) or unsigned (U)) (e.g., 64-bit) integer (INT), pointer, capability, single-precision floating-point value, double-precision floating-point value, etc. In certain examples, a second category 404 is a heterogeneous structure comprised of one or more elements of varying types, e.g., including capabilities and/or pointers to other structures located elsewhere in memory. Examples include a single node in a linked list or in a binary tree. In certain examples, a third category 406 is a contiguous array of homogeneous elements (e.g., an array of values (e.g., integers or pointers)) or an array of (e.g., heterogenous) structures (e.g., a combination of integers, capabilities, and/or pointers).

Figure 5:
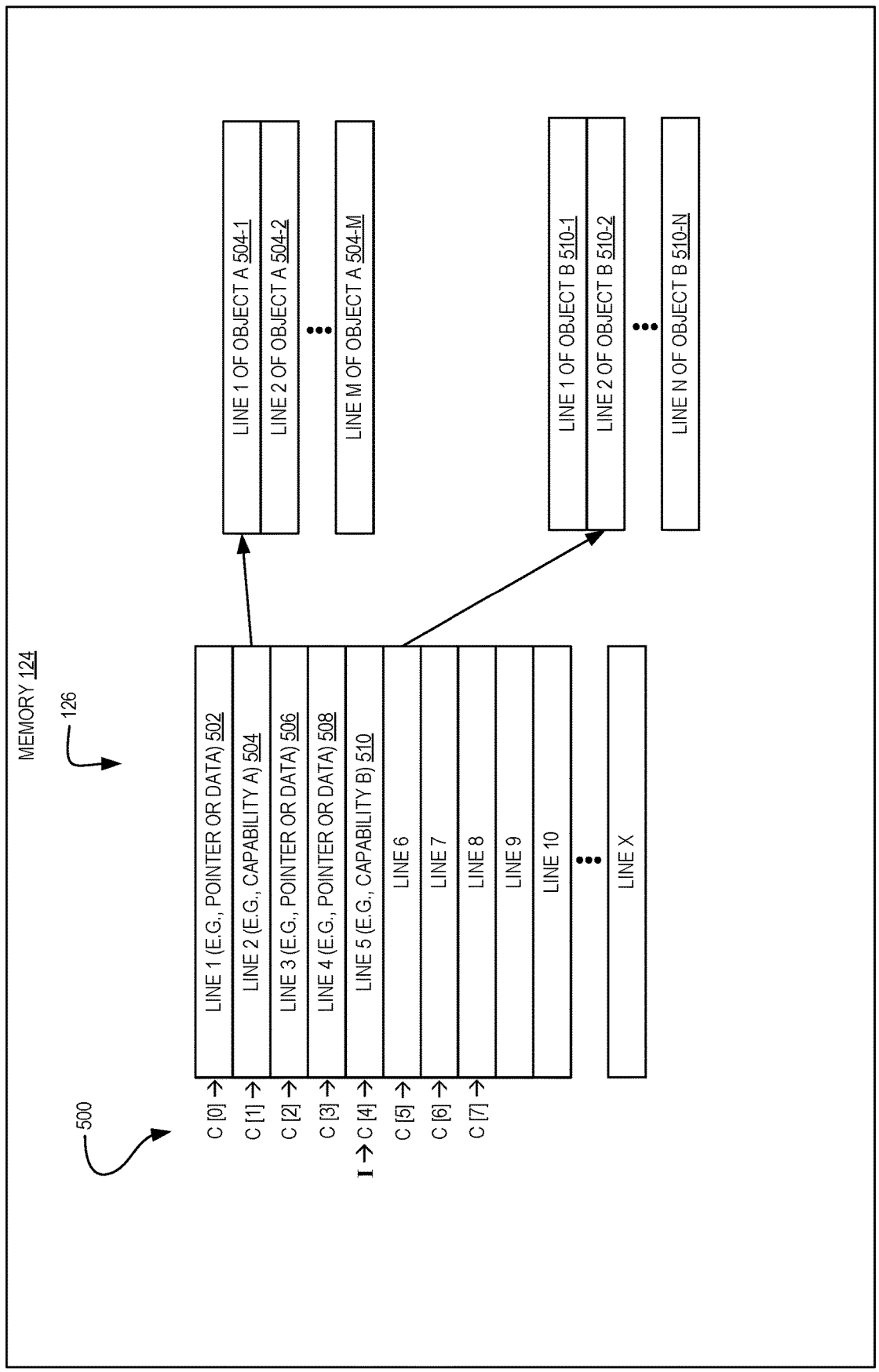
FIG. 5 illustrates a memory storing a first capability for a first object "A" and a second capability for a second object "B" according to examples of the disclosure.

FIG. 5 illustrates a memory 124 storing a first capability 504 for a first object "A" 504-1 to 504-M (e.g., where M is a positive integer greater than one) and a second capability 510 for a second object "B" 510-1 to 510-M (e.g., where N is a positive integer greater than one) according to examples of the disclosure. In certain examples, an array 500 includes one or more elements stored therein that are addresses, e.g., capabilities for those addresses. In certain examples, array 500 is a third object "C" having eight elements indexed 0 to 7.

In certain examples, the array 500 itself is indicated by pointer(s) and/or capabilit(ies), for example, a non-capability pointer "I" or capability "I" that identifies one of the elements of the array 500, e.g., via a capability's address field (e.g., as shown in FIG. 2A or 2B). In the depicted example in FIG. 5, "I" can either be (a) a capability that points to C[4] and protects object "C", or (b) a raw (e.g., non-capability) pointer that points to C[4], e.g., where 4 is the index into the elements of the object. In certain examples, one or more of the elements of array 500 are prefetched (e.g., as indicated by a capability "I" or a raw pointer "I" for one of those elements), and those one or more elements of array 500 are checked to determine if any are capabilities (e.g., via checking whether a corresponding validity tag is set that indicates that data is a valid capability), and if so, then, causing an additional prefetch of the memory location(s) indicated by that capability, and/or if not, not causing an additional prefetch that assumes those element(s) of the array 500 are memory location(s).

In certain examples, at least second element 504 and fifth element 510 (e.g., because they are capabilities) are prefetched from memory 124 into a processor (e.g., processor 100 in the figures) (e.g., into at least the prefetch circuit 120 and/or cache(s) 122 thereof). In certain examples, the array is protected by a capability "I" that indicates array "C" includes eight elements, so each of lines 1-8 are prefetched into a processor (e.g., processor 100 in the figures) (e.g., into at least the prefetch circuit 120 and/or cache(s) 122 thereof).

Although the following paragraph references data as stored in memory 124, it should be understood that the array 500 is prefetched into a processor (e.g., processor 100 in the figures) (e.g., into at least the prefetch circuit 120 and/or cache(s) 122 thereof) in certain examples. In certain examples, a first element 502 (e.g., line) from memory stores a pointer or data that the hardware (e.g., capability management circuit 108) detects is not a capability, a second element 504 (e.g., line) from memory stores a capability that the hardware (e.g., capability management circuit 108) detects as a capability (e.g., not data and not a non-capability pointer), a third element 506 (e.g., line) from memory stores a pointer or data that the hardware (e.g., capability management circuit 108) detects is not a capability, a fourth element 508 (e.g., line) from memory stores a pointer or data that the hardware (e.g., capability management circuit 108) detects is not a capability, and/or a fifth element 510 (e.g., line) from memory stores a capability that the hardware (e.g., capability management circuit 108) detects as a capability (e.g., not data and not a non-capability pointer).

In certain examples, a capability includes an address that points to a single one of multiple elements of an object protected by that capability, for example, with the capability "A" from second element 504 (e.g., line) from memory pointing to first element 504-1 (e.g., line) of object A and the capability "B" from fifth element 510 (e.g., line) from memory pointing to a second element 510-2 (e.g., line) of object B.

In certain examples, a prefetcher (e.g., prefetch circuit 120) is to detect, for a prefetch of the line 2 at 504, that it is a capability (e.g., first capability "A"), and, based on that being a capability (e.g., instead of a non-capability value), then prefetch one or more elements of object "A" that are protected by the first capability "A", e.g., to prefetch one or more (e.g., all) element(s) 504-1 to 504-M of object "A" identified by the first capability "A" (for example, via its upper and/or lower bounds field, e.g., bounds 110B in FIGS. 2A and 2B). In certain examples, the prefetcher (e.g., prefetch circuit 120) is to detect, for a prefetch of the line 2, that it is a capability (e.g., first capability "A") pointing to an (e.g., single) element in object A and prefetch that element. In certain examples, a prefetcher (e.g., prefetch circuit 120) detects that there are one or more additional elements before and/or after the "pointed to" element of the capability and causes them to be prefetched, for example, if line 1 504-1 of object A is pointed to by the capability A, the prefetcher is then to prefetch line 2 504-2 up to line M 504-M (e.g., from memory 124 into a cache).

In certain examples, a prefetcher (e.g., prefetch circuit 120) is to detect, for a prefetch of the line 5 at 510, that it is a capability (e.g., second capability "B"), and, based on that being a capability (e.g., instead of a non-capability value), then prefetch one or more elements of object "B" that are protected by the second capability "B", e.g., to prefetch one or more (e.g., all) element(s) 510-1 to 510-N of object "B" identified by the first capability "B" (for example, via its upper and/or lower bounds field, e.g., bounds 110B in FIGS. 2A and 2B). In certain examples, the prefetcher (e.g., prefetch circuit 120) is to detect, for a prefetch of the line 5, that it is a capability (e.g., first capability "B") pointing to an (e.g., single) element in object B and prefetch that element. In certain examples, a prefetcher (e.g., prefetch circuit 120) detects that there are one or more additional elements before and/or after the "pointed to" element of the capability and causes them to be prefetched, for example, if line 1 510-2 of object B is pointed to by the capability B, the prefetcher is then to prefetch line 1 510-1 and/or line 3 up to line N 510-N (e.g., from memory 124 into a cache).

In certain examples, a data structure (e.g., data structure 134) is utilized by the prefetch circuit to control prefetching. In certain examples, the data structure 134 is within the prefetch circuit 120. In certain examples, the data structure 134 is not within the prefetch circuit 120, e.g., depending on a processor's implementation. For example, if the processor has an execution circuit 106 that executes load hints, then the data structure 134 could be located within or adjacent to that execution circuit 106. For example, suppose the prefetch circuit 120 consumes a capability load hint with address/offset value "x" and capability metadata "b" (e.g., including bounds, permissions, etc.), thus in certain examples, the execution circuit 106 uses "b" and "x" as inputs to 706 and 708, respectively, to perform the operations in FIG. 7 and issue loads (e.g., through the prefetch circuit or through some other implementation-dependent circuit(s)).

In other examples, at least second element 504 and fifth element 510 (e.g., because they are capabilities) are prefetched from memory 124 into a processor (e.g., processor 100 in the Figures) (e.g., into at least the prefetch circuit 120 and/or cache(s) 122 thereof). In certain of these examples, the array "C" is accessed either using a capability and the processor does not use the capability bounds to inform the prefetching of elements of "C" (but these elements may still be prefetched by some other heuristic), or "C" is accessed using a raw (e.g., non-capability) pointer and elements of "C" may still be prefetched by some other heuristic. In certain of these examples the data prefetched (which may or may not be within the bounds of "C") may, e.g., at a stride of "D" bytes, be scanned for valid capabilities. Each scanned location that contains a valid capability may have its protected element(s) be prefetched by the processor in the manner described in the prior paragraph, e.g., but according to the operations in FIG. 8.

FIG. 6 illustrates an example format for a data structure 134 for capability based prefetching according to examples of the disclosure. In certain examples, one or any combination (e.g., all) of the depicted types (shown as columns) may be utilized. In FIG. 6, data structure 134 is shown as a table including a first column for a capability index 602 (e.g., with the value in an entry (shown as a row) indicating which capability (e.g., object protected by that capability) of a plurality of capability, a second column for a most recent offset accessed 604 (for example, a most recent offset (e.g., element by element offset) that was accessed in that capability) (for example, if the most recent access to object "B" in FIG. 5 was line 2 510-2, offset 604 is set to a value that identifies line 2 of object "B"), a third column for a most recent offset prefetched 606 (for example, a most recent offset (e.g., element by element offset) that was prefetched for that capability) (for example, if the most recent prefetch for object "B" in FIG. 5 was line 3, offset 606 is set to a value that identifies line 3, e.g., such that additional prefetches are tracked as they occur), a fourth column for a thread identification (ID) value and/or a logical processor ID value 608 (for example, a thread ID value and/or a logical processor ID value that indicate which hardware thread of a plurality of hardware threads and/or logical processor of a plurality of logical processors that created and/or updated the entry, respectively), and/or a fifth column for a valid and/or timeout and/or age value 610 (for example, a valid bit that when set (e.g., to one) indicates the entry (shown as a row) is valid and when cleared (e.g., to zero) indicates the entry is invalid and thus not to be used and/or a timeout value to indicate a time for the entry so that the entry can be invalidated after the elapse of a time period).

In certain examples, data structure 134 is implemented in hardware, e.g., as part of prefetch circuit and/or capability management circuit. In certain examples, data structure 134 associates each capability in the data structure with the most recent access that has been made using the capability. Such a table can be implemented (e.g., compactly) as a direct lookup table, e.g., as a table where the domain (e.g., a representation of the capability) is used as an index to select the corresponding element of the codomain, the most recent access that was made using the capability.

As permitted by hardware, data structure 134 (e.g., table) may contain 2^n entries, where n is the number of bits (e.g., a proper subset of bits that represent a capability) that are sampled from the capability, for example, where "n" is the number of a subset of bits sampled from the capability or "n" is the hash of a subset of bits sampled from the capability. The example in FIG. 6 has n=3 where, for instance, the lowest-order 3 bits of each capability are used to form the index. In certain examples, a larger value of n will reduce false positive prefetches triggered by collisions within the data structure 134 (e.g., table), but may also consume more die space on a physical chip.

In certain examples, each entry in the data structure 134 (e.g., table) includes m bits (e.g., a proper subset of bits) that are sampled from the most recent offset within the capability bounds that was accessed. For instance, this could be the lowest-order m bits of the offset (in the example in FIG. 6, m=8). In certain examples, the total size of the data structure 134 (e.g., as a direct lookup table) is m×2^n bits. In certain examples, a higher value of m will reduce the frequency of false positives due to collisions, but may also cost more die area.

Supporting Capability-Informed "Indirect Prefetching" During Array Iteration

FIG. 7 shows examples operations of the lookup data structure 134 (e.g., table) in conjunction with a memory access through a capability, and that (optionally), for another capability that is prefetched, further prefetches one or more of the memory locations indicated by that prefetched capability. More particularly, FIG. 7 is a flow diagram illustrating operations 700 of a method for prefetching based on a capability according to examples of the disclosure. Some or all of the operations 700 (or other processes described herein, or variations, and/or combinations thereof) are performed under the control of a prefetch circuit and/or capability management circuit as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by prefetch circuit 120 and/or capability management circuit 108 of the other figures.

The operations 700 include, at block 702, starting the operations, e.g., enabling prefetch based on a capability. The operations 700 further include, at block 704, receiving a memory access request through a capability (e.g., this access being detected at or after execution (e.g., in an execution stage of a pipelined processor) and/or at or after retirement (e.g., in a retirement stage of a pipelined processor). The operations 700 further include, at block 706, using the capability (for example, all of the capability bits or a proper subset of the capability bits, e.g., a hash of a plurality of (e.g., all of) capability bits) to index into a data structure for capability based prefetching (e.g., data structure 134). For example, if the capability corresponds to an index of 001, accessing the second entry in the data structure 134 as depicted in FIG. 6. In certain examples, any sequence of bits that are associated with, or are derived from, the capability is used to index into the data structure for capability based prefetching (e.g., data structure 134). The operations 700 further include, at block 708, comparing a current offset from the capability (e.g., current element of a plurality of elements of an object corresponding to the capability) to a saved offset from the data structure (e.g., most recent accessed 604 in FIG. 6 for that entry) for capability based prefetching (e.g., data structure 134) to generate the delta ("D") of those offsets. The operations 700 further include, at block 710, checking if the delta ("D") is zero, and if yes, it is the end of the operations 700 at block 718, and if no, proceeding to block 712 for prefetching of one or more (e.g., "K") memory locations of the capability (e.g., not exceeding the bound(s) of the capability) (e.g., at a stride of "D" bytes relative to the current offset). The operations at block 712 may include not prefetching any data (e.g., elements) that were already prefetched (e.g., based on the most recent offset prefetched 606 in FIG. 6 for that entry). The operations 700 further include, at block 714, for (e.g., each) of the one or more (e.g., "K") memory locations of the capability that themselves store a capability, prefetching the capability's corresponding memory locations (e.g., element(s) stored in those memory locations) (e.g., and if not a capability, not performing a prefetch that assumes that data from one of the "K" memory locations was a pointer and/or capability) and proceeding to block 716. The operations 700 further include, at block 716, updating the (e.g., same entry of the) data structure for capability based prefetching (e.g., data structure 134) with the current offset, and then proceeding to the end of the operations 700 at block 718.

Referring to FIG. 5 (e.g., where "I" is a non-capability pointer or a capability that identifies one of the elements of the array 500), as one example, if the prefetch at block 712 is of one or more elements (e.g., all elements) of array 500 in FIG. 5, then, at block 714, prefetcher (e.g., prefetch circuit 120) is to:

(i) detect, for the prefetch of the line 2 at 504, that it is a capability (e.g., first capability "A"), and, based on that being a capability (e.g., instead of a non-capability value), then prefetch one or more elements of object "A" that are protected by the first capability "A", e.g., to prefetch one or more (e.g., all) element(s) 504-1 to 504-M of object "A" identified by the first capability "A" (for example, via its upper and/or lower bounds field, e.g., bounds 110B in FIGS. 2A and 2B). In certain examples, the prefetcher (e.g., prefetch circuit 120) is to detect, for a prefetch of the line 2, that it is a capability (e.g., first capability "A") pointing to an (e.g., single) element in object A and prefetch that element. In certain examples, a prefetcher (e.g., prefetch circuit 120) detects that there are one or more additional elements before and/or after the "pointed to" element of the capability and causes them to be prefetched, for example, if line 1 504-1 of object A is pointed to by the capability A, the prefetcher is then to prefetch line 2 504-2 up to line M 504-M (e.g., from memory 124 into a cache); and/or (ii) detect, for a prefetch of the line 5 at 510, that it is a capability (e.g., second capability "B"), and, based on that being a capability (e.g., instead of a non-capability value), then prefetch one or more elements of object "B" that are protected by the second capability "B", e.g., to prefetch one or more (e.g., all) element(s) 510-1 to 510-N of object "B" identified by the first capability "B" (for example, via its upper and/or lower bounds field, e.g., bounds 110B in FIGS. 2A and 2B). In certain examples, the prefetcher (e.g., prefetch circuit 120) is to detect, for a prefetch of the line 5, that it is a capability (e.g., first capability "B") pointing to an (e.g., single) element in object B and prefetch that element. In certain examples, a prefetcher (e.g., prefetch circuit 120) detects that there are one or more additional elements before and/or after the "pointed to" element of the capability and causes them to be prefetched, for example, if line 1 510-2 of object B is pointed to by the capability B, the prefetcher is then to prefetch line 1 510-1 and/or line 3 up to line N 510-N (e.g., from memory 124 into a cache).

Note that the data structure for capability based prefetching (e.g., data structure 134) and its behavior can be augmented to further improve the precision. For example, some examples on processors that support simultaneous multi-threading (SMT) (e.g., Intel® Hyper-Threading) tag each entry with a bit(s) corresponding to the hardware thread and/or logical processor that created the entry, e.g., such that an (e.g., each) entry is only used and/or updated for actions by that corresponding hardware thread and/or logical processor. In certain examples, entries in the data structure have associated bit(s) corresponding to the lifetime of the entry, for example, a valid bit that is cleared after some duration and/or cleared on a specific event (e.g., a context switch).

Figure 8:
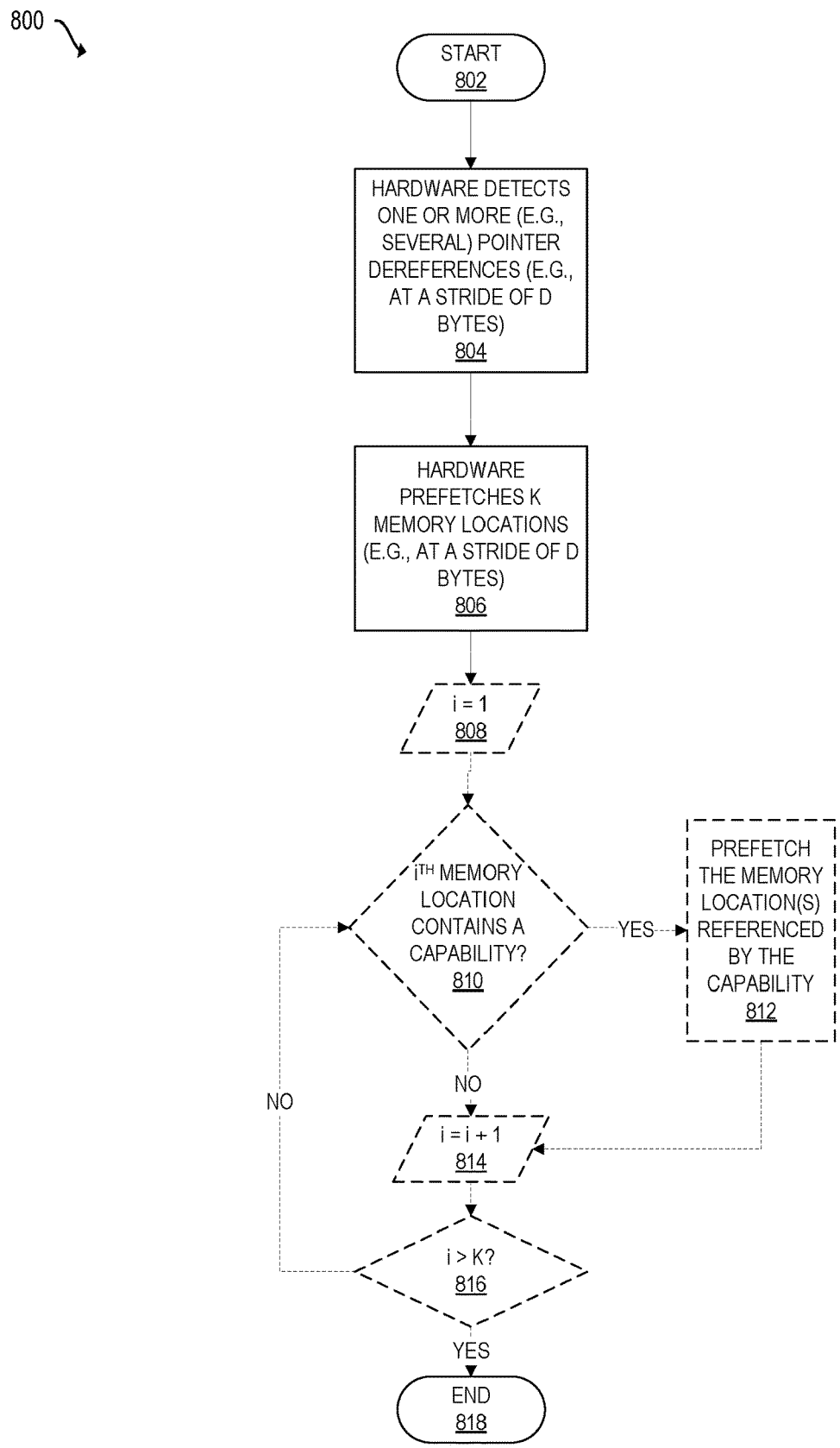
FIG. 8 is a flow diagram illustrating operations of another method for indirect prefetching based on a capability according to examples of the disclosure.

In certain examples, the dashed block at 714 in FIG. 7 is equivalent to the loop depicted in FIG. 8 with dashed blocks (blocks 808, 810, 812, 814, and 816), but for brevity, it is shown as a single box in FIG. 7). In other examples, the dashed block at 714 and/or dashed blocks in FIG. 8 are implemented with parallel prefetch circuits, e.g., depicted in FIG. 3.

In certain examples, the operations shown in FIG. 7 can be implemented as an extension to hardware prefetchers that are not already enlightened to capabilities, e.g., a prefetcher that does not use a capability as an input (e.g., a "capability unaware" prefetch circuit). In certain examples, the operations shown in FIG. 7 reduce the number of false positives. For example, consider two arrays of pointers A and B that are adjacent in memory. Suppose that a program is iterating through A and dereferencing pointers. In certain examples, prefetcher is unaware of the bounds of A, and therefore may observe capabilities in array B and prefetch their memory references, even though these capabilities will not be used while iterating through A. In contrast, in certain examples, the method shown in FIG. 7 is aware of the bounds of A, and therefore will only perform the indirect prefetching within A, e.g., unless or until the program begins to iterate through B. Certain examples herein thus prevent anything other than a capability from being treated as a memory reference, e.g., such that it is not possible for some arbitrary value in memory to be considered as an indirect prefetch (e.g., "pointer prefetch") candidate and/or used for the indirect prefetch.

Augmenting "Indirect Prefetch" Hardware to Use Memory Bounds Information Encoded in Capabilities FIG. 8 is a flow diagram illustrating operations 800 of another method for indirect prefetching based on a capability according to examples of the disclosure. Some or all of the operations 800 (or other processes described herein, or variations, and/or combinations thereof) are performed under the control of a prefetch circuit and/or capability management circuit as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by prefetch circuit 120 and/or capability management circuit 108 of the other figures.

The operations 800 include, at block 802, starting the operations, e.g., enabling (e.g., indirect) prefetch based on a capability. The operations 800 include, at block 804, detecting, via hardware (for example, a processor, e.g., a prefetch circuit of a system), one or more (for example, a plurality greater than a threshold, e.g., where the threshold is selectable in the system) pointer and/or capability dereferences (e.g., at a stride of "D" bytes, where D is a positive integer), for example, detecting that data (e.g., data prefetched in a cache) being accessed (for example, in an array, e.g., at the stride of "D" bytes) is a pointer(s) and/or capability, e.g., in contrast to a value that does not point to a different memory location. The operations 800 further include, at block 806, prefetching, via hardware (for example, the processor, e.g., the prefetch circuit of a system), one or more (e.g., "K") memory locations (e.g., at the stride of "D" bytes). The operations 800 further include, at block 808, setting an index "i" to an initial value (e.g., 1) to indicate that an "element to be checked" is the initial element of the prefetched (e.g., "K") memory location(s). The operations 800 further include, at block 810, checking if the indexed element (e.g., starting at an index value of 1) of the prefetched (e.g., "K" memory locations) includes (e.g., is) a capability, and (i) if no at block 810, incrementing the index value (e.g., by one) at block 814 and, at block 816, checking if all of the "K" memory locations have been checked (e.g., is "i" greater than "K"), and, if yes at block 816, proceeding to the end of the operations 800 at block 818, and if no at block 816, returning to block 810; and if (ii) yes at block 810, prefetching the memory location(s) referenced by the capability (e.g., prefetching the single element that is addressed in the capability or a plurality (e.g., all of) the elements protected by the capability (e.g., within the bounds of the capability).

In certain examples, one or more of the operations 800 are performed by a prefetch circuit (e.g., prefetch circuit 120) and/or a capability management circuit (e.g., capability management circuit 108). In one example, the capability check(s) at block 810 is performed by a capability management circuit, for example, and those results are passed to a prefetch circuit (e.g., to cause the prefetch(es) at block 812.

Referring to FIG. 5 (e.g., where "I" is a capability that identifies one of the elements of the array 500 and protects the array as object "C"), as one example, if the prefetch at block 806 is of one or more elements of array 500 in FIG. 5, then, at block 810, the checking (e.g., by a capability management circuit) is if any of the elements (e.g., lines 1-8 in array "C") are capabilities, e.g., and where prefetched element 2 (e.g., index "1") 504 (e.g., one or more cache lines) is a capability (for object "A"), causing, at block 812, the prefetch of one or more elements (e.g., one or more cache lines) 504-1 to 504-M of object "A" and/or where prefetched element 5 (e.g., index "4") 510 (e.g., one or more cache lines) is a capability (for object "B"), causing, at block 812, the prefetch of one or more elements (e.g., one or more cache lines) 510-1 to 510-M of object "B".

In certain examples, the check at block 810 does not actually have access to modify the capability (e.g., validity tag thereof), for example, it is only to check that there is an active capability (e.g., indicated via a validity tag set to "valid") or not.

In certain examples, a processor (e.g., CPU) implements indirect prefetch hardware with detection heuristics that identify pointer dereferences at a stride. In certain examples, the processor (e.g., prefetch circuit) detects that a sequence of (e.g., 64-bit) elements at a stride of a certain number of (e.g., 64) bytes have all been used to dereference memory, and the processor (e.g., prefetch circuits) is then to trigger, for example, a certain number of (e.g., 32) prefetches at the stride (e.g., of 64 bytes) beyond the most recently detected dereference. Thus, certain examples herein provide for a detect-and-prefetch system and method to be extended to take advantage of memory bounds information encoded in a capability (including bounded pointer, "fat" pointer, Intel® MPX, etc.). In certain examples, an (e.g., array) prefetch circuit is modified (e.g., via the dotted structures in FIG. 8) to conduct indirect prefetching that is informed by a capability (e.g., an array bounds encapsulated in the capability).

Note that the iteration of the loop in FIG. 8 does not necessarily need to be executed serially. For example, where an indirect prefetch circuit already knows the address of the most recent pointer dereference "p" as well as the detected stride "d", and the value k is a determined value or hardware-defined constant that represents the maximum number of memory locations to prefetch. Hence the memory locations $p_i$ to prefetch can be computed in parallel as (where the is a multiplication):

$$p_1 = p + 1 \cdot d$$
$$p_2 = p + 2 \cdot d$$
$$\vdots$$
$$p_k = p + K \cdot d$$

In certain examples, each $p_i$ (from 1 to "K") is used to prefetch memory only if the location $p_i$ contains a capability. For example, in the certain capability architectures, $p_i$ would require an associated validity tag (e.g., being set to indicate valid and not invalid).

FIG. 9 is a flow diagram illustrating operations 900 of yet another method for prefetching based on a capability according to examples of the disclosure. Some or all of the operations 900 (or other processes described herein, or variations, and/or combinations thereof) are performed under the control of a prefetch circuit and/or capability management circuit as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 900 are performed by prefetch circuit 120 and/or capability management circuit 108 (e.g., and execution circuit) of the other figures.

The operations 900 include, at block 902, executing, by an execution circuit of a processor, an instruction that generates a memory access request for an element in (e.g., from) memory via a first capability. The operations 900 further include, at block 904, checking, by a capability management circuit of the processor, the first capability for the memory access request, the first capability comprising an address field of the element in the memory, a validity field, and a bounds field that is to indicate a lower bound and an upper bound of a first object to which the first capability authorizes access. The operations 900 further include, at block 906, prefetching, by a prefetch circuit of the processor, an additional element of the first object from the memory based on the first capability (e.g., where the additional element is a capability protecting a different object than the object protected by the first capability) (e.g., the additional element having a different address than an address indicated by an address field of the first capability). The operations 900 further include, at block 908, determining, by the processor, if the additional element is a second capability comprising an address field of a second element in the memory, a validity field, and a bounds field that is to indicate a lower bound and an upper bound of a second object to which the second capability authorizes access. The operations 900 further include, at block 910, prefetching, by the prefetch circuit, the second element from the memory to a cache of the processor based on the additional element being the second capability.

The following discusses examples of prefetching for the three categories of (e.g., contiguous) data structures discussed in reference to FIG. 4 to improve prefetching accuracy.

Category 1. In certain examples, an access to a single data element (e.g., single machine element) that is not part of a larger data structure does not trigger (e.g., proximal) prefetching. To understand why this can be a problem, consider register refills (e.g., from stack spill slots) (e.g., where a "spill" occurs when there are not enough registers for the variables used by a program). For example, suppose that a program returns from a procedure call and needs to refill some registers that were overwritten or deleted (e.g., clobbered) by the procedure. Refilling the registers from the stack may often happen linearly (e.g., with monotonically increasing and/or decreasing addresses) and at a fixed stride. A hardware prefetcher could easily misinterpret this behavior as an array access, and then proceed to aggressively prefetch stack memory that will not be used, and thus create unnecessary memory traffic and potentially evict hot data from the processor (e.g., CPU's) cache(s). Examples herein enhance prefetching behavior in one of two example ways, depending on how capabilities are used to access the stack: (1) the first example way: if each spill slot is assigned its own capability, then according to the operations discussed herein (e.g., in FIG. 7), each spill slot would receive its own entry in the data structure for capability based prefetching (e.g., data structure 134), and hence an access to one spill slot followed by an access to another would not trigger the prefetcher, and thus false positives would be reduced, and (2) the second example way: if the current stack frame (for example, for the spill slots allocated on the current stack frame, e.g., where the lower bound of the stack pointer capability corresponds to the stack frame's top, and the upper bound corresponds to the stack frame's bottom) is assigned its own capability (e.g., this may be ideal to prevent the return address from being inadvertently or maliciously overwritten), then prefetching is triggered by consecutive register fills (e.g., but this prefetching would be constrained to the current stack frame where future accesses are most likely, given the principle of locality), and thus false positives are reduced and true positives are increased.

Category 2. In certain examples, prefetching is (e.g., often) conducted at cache-line granularity (e.g., on many current architectures this is 64 bytes, i.e., 512 bits). In certain examples, if the heterogeneous structure is no larger than the granularity of prefetching, then the operations discussed herein (e.g., in FIG. 7) will prevent sporadic prefetching from being triggered by multiple accesses within the heterogeneous structure, and/or if the heterogeneous structure is larger than the granularity of prefetching, then prefetching is triggered within the bounds of the structure, e.g., such the operations discussed herein (e.g., in FIG. 7) will not only trigger this prefetching behavior, but it will do so aggressively, e.g., after only a threshold number of (e.g., two, three, etc.) accesses within the structure.

Category 3. In certain examples, for an array of elements confined by the bounds of a capability, the operations discussed herein (e.g., in FIG. 7) will begin to aggressively prefetch memory as soon as the array is accessed a threshold number of times (e.g., twice, three times, etc.). Note that this threshold may be sooner than an array prefetcher that must rely on several accesses to establish a likely array iteration pattern. Moreover, the prefetching according to certain examples herein will not exceed the bounds of the array, as determined by the capability.

Exemplary architectures, systems, etc. that the above may be used in are detailed below. Exemplary instruction formats for (e.g., capability) instructions are detailed below.

At least some examples of the disclosed technologies can be described in view of the following examples:

Example 1. An apparatus comprising:
an execution circuit to execute an instruction that generates a memory access request for an element in memory via a first capability;
a capability management circuit to check the first capability for the memory access request, the first capability comprising an address field of the element in the memory, a validity field, and a bounds field that is to indicate a lower bound and an upper bound of a first object to which the first capability authorizes access;
a cache; and
a prefetch circuit to:
prefetch an additional element of the first object from the memory based on the first capability,
determine if the additional element is a second capability comprising an address field of a second element in the memory, a validity field, and a bounds field that is to indicate a lower bound and an upper bound of a second object to which the second capability authorizes access, and
prefetch the second element from the memory to the cache based on the additional element being the second capability.

Example 2. The apparatus of example 1, wherein the prefetch circuit is to prefetch the additional element of the first object from the memory to the cache based on the first capability.

Example 3. The apparatus of any one of examples 1-2, wherein the prefetch circuit is to cause a prefetch of one or more further elements of the second object from the memory to the cache based on the one or more further elements being within the lower bound and the upper bound indicated by the second capability.

Example 4. The apparatus of example 3, wherein the one or more further elements of the second object are a plurality of further elements of the second object within the lower bound and the upper bound indicated by the second capability.

Example 5. The apparatus of any one of examples 3-4, wherein the prefetch circuit comprises a plurality of prefetch circuits, and the plurality of prefetch circuits are to prefetch the second element from the memory to the cache in parallel with the prefetch of the one or more further elements of the second object from the memory to the cache.

Example 6. The apparatus of any one of examples 1-5, wherein the prefetch circuit is to:
prefetch a second additional element of the first object from the memory based on the first capability,
determine if the second additional element is a third capability comprising an address field of a third element in the memory, a validity field, and a bounds field that is to indicate a lower bound and an upper bound of a third object to which the third capability authorizes access, and
prefetch the third element from the memory to the cache based on the second additional element being the third capability.

Example 7. The apparatus of example 6, wherein the prefetch circuit is to cause a prefetch of one or more further elements of the third object from the memory to the cache based on the one or more further elements being within the lower bound and the upper bound indicated by the third capability.

Example 8. The apparatus of any one of examples 1-7, wherein the prefetch circuit is to prefetch the additional element of the first object from the memory based on the additional element being within the lower bound and the upper bound of the first object indicated by the first capability.

Example 9. The apparatus of any one of examples 1-8, wherein the first object of the first capability and the second object of the second capability are a same object (or are different objects).

Example 10. A method comprising:
executing, by an execution circuit of a processor, an instruction that generates a memory access request for an element in memory via a first capability;
checking, by a capability management circuit of the processor, the first capability for the memory access request, the first capability comprising an address field of the element in the memory, a validity field, and a bounds field that is to indicate a lower bound and an upper bound of a first object to which the first capability authorizes access;
prefetching, by a prefetch circuit of the processor, an additional element of the first object from the memory based on the first capability;
determining, by the processor, if the additional element is a second capability comprising an address field of a second element in the memory, a validity field, and a bounds field that is to indicate a lower bound and an upper bound of a second object to which the second capability authorizes access; and prefetching, by the prefetch circuit, the second element from the memory to a cache of the processor based on the additional element being the second capability.

Example 11. The method of example 10, wherein the prefetching of the additional element comprises prefetching the additional element of the first object from the memory to the cache based on the first capability.

Example 12. The method of any one of examples 10-11, further comprising prefetching, by the prefetch circuit, one or more further elements of the second object from the memory to the cache based on the one or more further elements being within the lower bound and the upper bound indicated by the second capability.

Example 13. The method of example 12, wherein the one or more further elements of the second object are a plurality of further elements of the second object within the lower bound and the upper bound indicated by the second capability.

Example 14. The method of any one of examples 12-13, wherein the prefetch circuit comprises a plurality of prefetch circuits, and the plurality of prefetch circuits perform the prefetching of the second element from the memory to the cache in parallel with the prefetching of the one or more further elements of the second object from the memory to the cache.

Example 15. The method of any one of examples 10-14, further comprising:
prefetching, by the prefetch circuit, a second additional element of the first object from the memory based on the first capability;
determining, by the processor, if the second additional element is a third capability comprising an address field of a third element in the memory, a validity field, and a bounds field that is to indicate a lower bound and an upper bound of a third object to which the third capability authorizes access; and
prefetching, by the prefetch circuit, the third element from the memory to the cache based on the second additional element being the third capability.

Example 16. The method of example 15, further comprising prefetching, by the prefetch circuit, one or more further elements of the third object from the memory to the cache based on the one or more further elements being within the lower bound and the upper bound indicated by the third capability.

Example 17. The method of any one of examples 10-16, wherein the prefetching of the additional element of the first object from the memory is based on the additional element being within the lower bound and the upper bound of the first object indicated by the first capability.

Example 18. A system comprising:
a memory;
a processor comprising:
an execution circuit to execute an instruction that generates a memory access request for an element in memory via a first capability, and
a cache separate from the memory;
a capability management circuit to check the first capability for the memory access request, the first capability comprising an address field of the element in the memory, a validity field, and a bounds field that is to indicate a lower bound and an upper bound of a first object to which the first capability authorizes access; and
a prefetch circuit to:
prefetch an additional element of the first object from the memory based on the first capability,
determine if the additional element is a second capability comprising an address field of a second element in the memory, a validity field, and a bounds field that is to indicate a lower bound and an upper bound of a second object to which the second capability authorizes access, and
prefetch the second element from the memory to the cache based on the additional element being the second capability.

Example 19. The system of example 18, wherein the prefetch circuit is to prefetch the additional element of the first object from the memory to the cache based on the first capability.

Example 20. The system of any one of examples 18-19, wherein the prefetch circuit is to cause a prefetch of one or more further elements of the second object from the memory to the cache based on the one or more further elements being within the lower bound and the upper bound indicated by the second capability.

Example 21. The system of example 20, wherein the one or more further elements of the second object are a plurality of further elements of the second object within the lower bound and the upper bound indicated by the second capability.

Example 22. The system of any one of examples 20-21, wherein the prefetch circuit comprises a plurality of prefetch circuits, and the plurality of prefetch circuits are to prefetch the second element from the memory to the cache in parallel with the prefetch of the one or more further elements of the second object from the memory to the cache.

Example 23. The system of any one of examples 18-22, wherein the prefetch circuit is to:
prefetch a second additional element of the first object from the memory based on the first capability,
determine if the second additional element is a third capability comprising an address field of a third element in the memory, a validity field, and a bounds field that is to indicate a lower bound and an upper bound of a third object to which the third capability authorizes access, and
prefetch the third element from the memory to the cache based on the second additional element being the third capability.

Example 24. The system of example 23, wherein the prefetch circuit is to cause a prefetch of one or more further elements of the third object from the memory to the cache based on the one or more further elements being within the lower bound and the upper bound indicated by the third capability.

Example 25. The system of any one of examples 18-24, wherein the prefetch circuit is to prefetch the additional element of the first object from the memory based on the additional element being within the lower bound and the upper bound of the first object indicated by the first capability.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 10A:
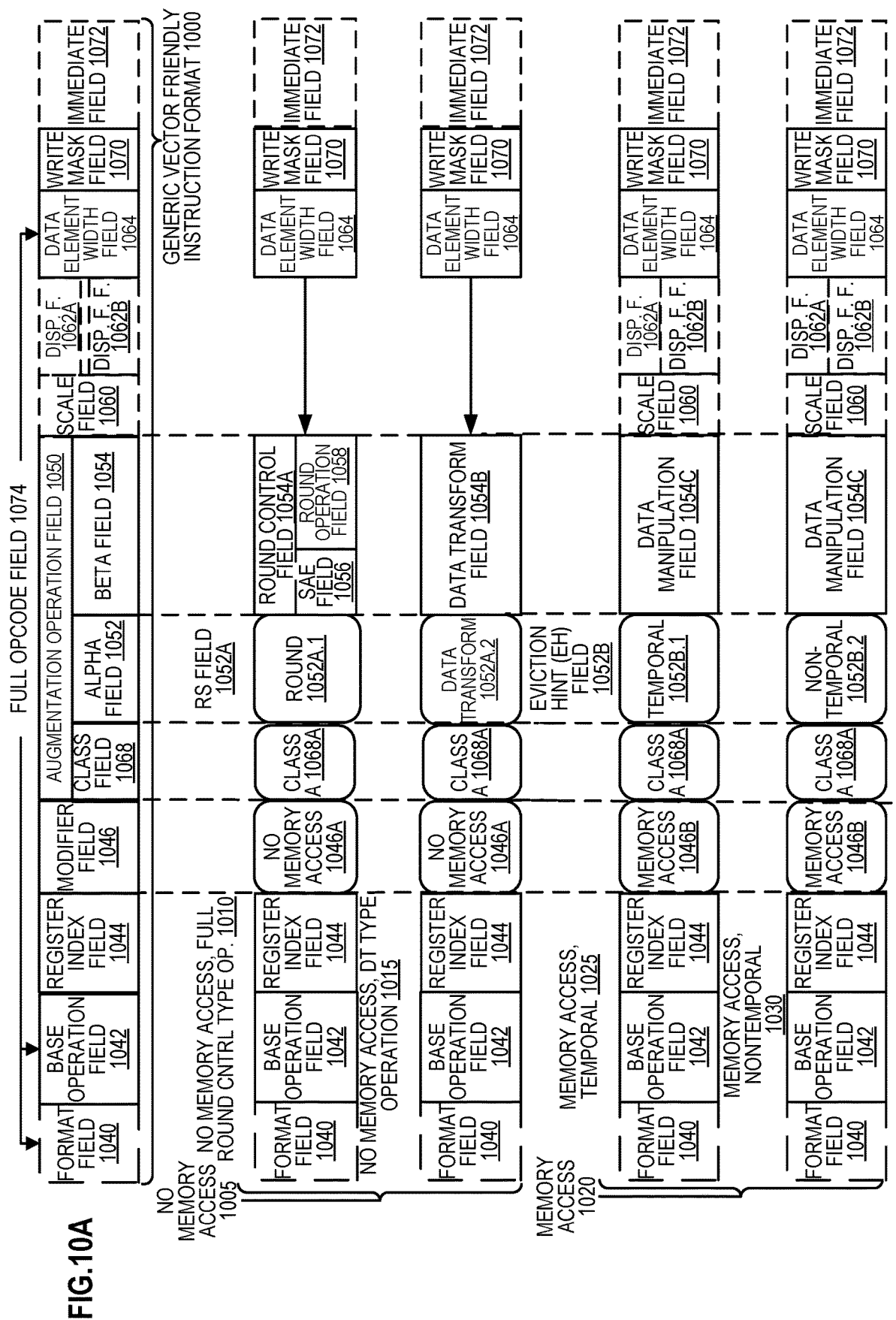
FIG. 10A is a block diagram illustrating a generic vector friendly instruction format and class A instruction templates thereof according to examples of the disclosure.
Figure 10B:
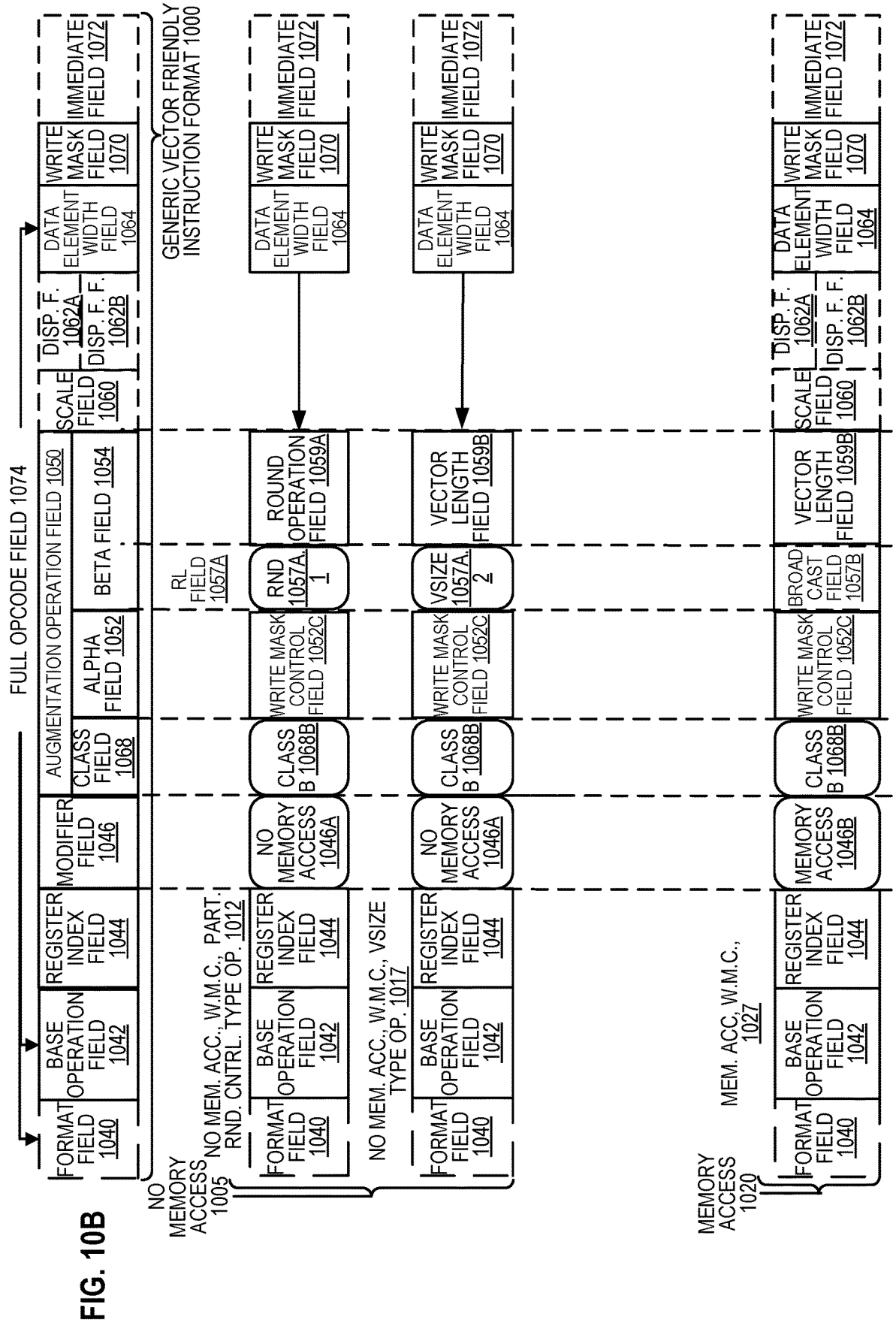
FIG. 10B is a block diagram illustrating the generic vector friendly instruction format and class B instruction templates thereof according to examples of the disclosure.

FIGS. 10A-10B are block diagrams illustrating a generic vector friendly instruction format and instruction templates thereof according to examples of the disclosure. FIG. 10A is a block diagram illustrating a generic vector friendly instruction format and class A instruction templates thereof according to examples of the disclosure; while FIG. 10B is a block diagram illustrating the generic vector friendly instruction format and class B instruction templates thereof according to examples of the disclosure. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 1050—its content distinguishes which one of a variety of different operations to be performed in addition to the base operation. This field is context specific. In one example of the disclosure, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}*index+base$).

Displacement Field 1062A—its content is used as part of memory address generation (e.g., for address generation that uses $2^{scale}*index+base+displacement$).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different examples may implement only one or none of the two.

Data element width field 1064—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While examples of the disclosure are described in which the write mask field's 1070 content selects one of a number of write mask registers that contains the write mask to be used (and thus the write mask field's 1070 content indirectly identifies that masking to be performed), alternative examples instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described examples of the disclosure the round control field 1054A includes a suppress all floating point exceptions (SAE) field 1056 and a round operation control field 1058, alternative examples may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one example of the disclosure where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one example of the disclosure where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one example is shown where the full opcode field 1074 includes all of these fields, the full opcode field 1074 includes less than all of these fields in examples that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according to examples of the disclosure. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although examples of the disclosure are described with reference to the specific vector friendly instruction format 1100 in the context of the generic vector friendly instruction format 1000 for illustrative purposes, the disclosure is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the disclosure is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in one example of the disclosure).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using is complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]—R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U)—If EVEX.U=0, it indicates class A or EVEX.U0; if EVEX.U=1, it indicates class B or EVEX.U1.

Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to one example of the disclosure. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one example of the disclosure. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
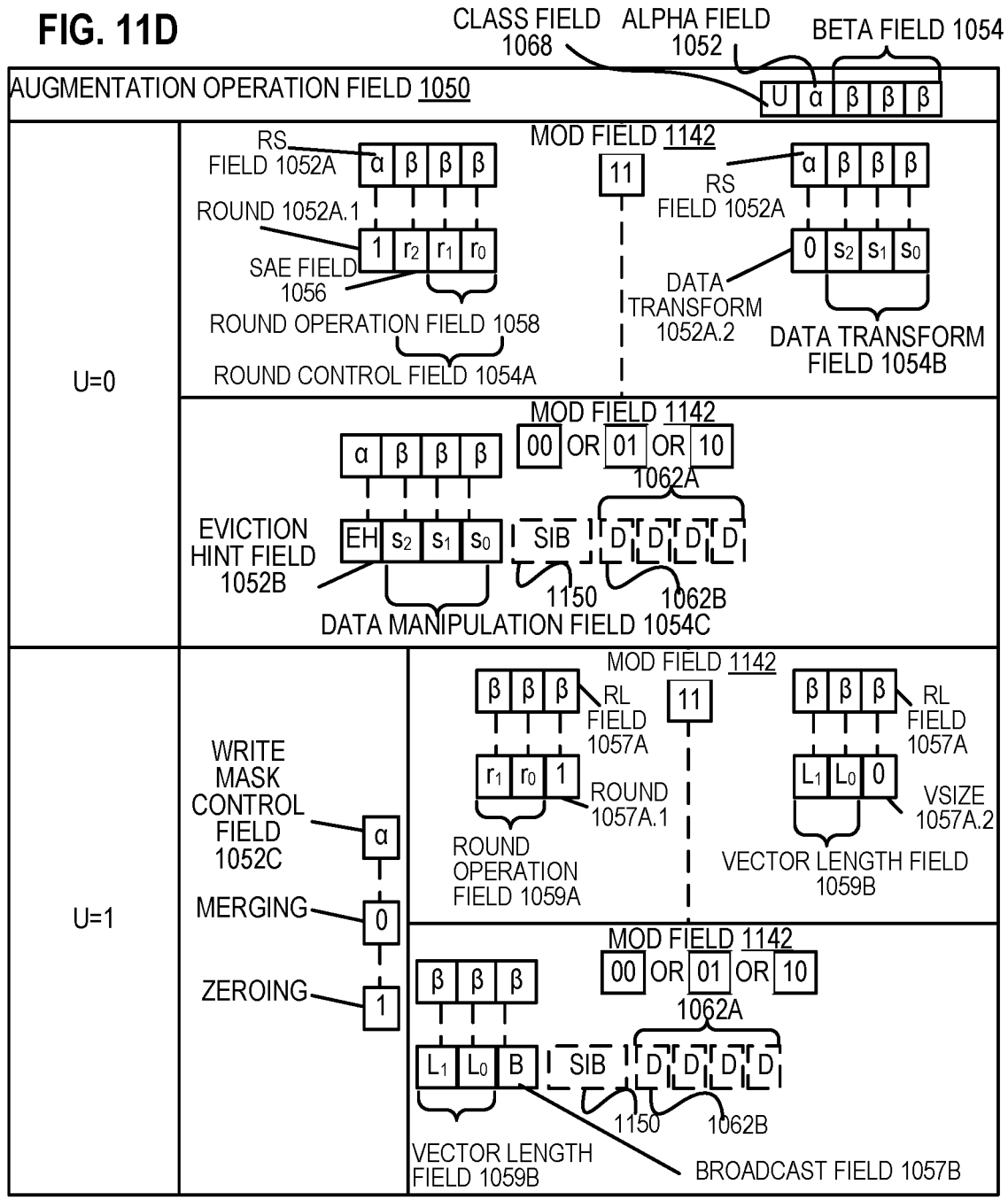
FIG. 11D is a block diagram illustrating the fields of the specific vector friendly instruction format in FIG. 11A that make up the augmentation operation field 1050 according to one example of the disclosure.

FIG. 11D is a block diagram illustrating the fields of the specific vector friendly instruction format 1100 that make up the augmentation operation field 1050 according to one example of the disclosure. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.A2) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—$L_{1-0}$) and the broadcast field 1057B (EVEX byte 3, bit [4]—B).

Exemplary Register Architecture

Figure 12:
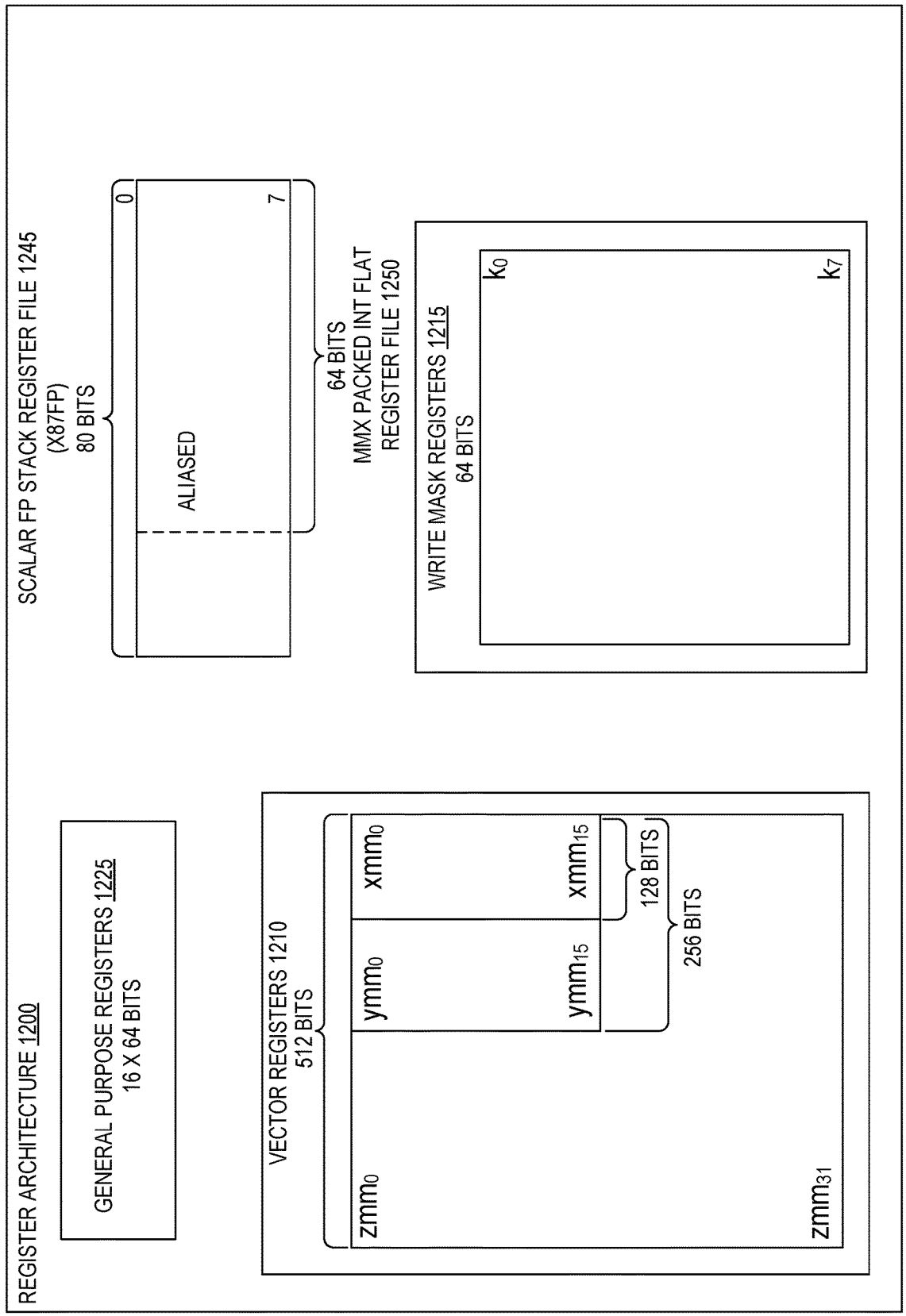
FIG. 12 is a block diagram of a register architecture according to one example of the disclosure.

FIG. 12 is a block diagram of a register architecture 1200 according to one example of the disclosure. In the example illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one example, the class B instruction templates of the specific vector friendly instruction format 1100 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1215—in the example illustrated, there are 8 write mask registers (k0 through k7), each 64 bits in size. In an alternate example, the write mask registers 1215 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to examples of the disclosure. FIG. 13B is a block diagram illustrating both an exemplary example of an in-order architecture core and an exemplary register renaming, out-of-order issue/execution architecture core to be included in a processor according to examples of the disclosure. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one example, the core 1390 includes a microcode ROM or other medium that stores microcode for certain macro-instructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1356, physical register file(s) unit(s) 1358, and execution cluster(s) 1360 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary example, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

In certain examples, a prefetch circuit 1378 is included to prefetch data, for example, to predict access addresses and bring the data for those addresses into a cache or caches (e.g., from memory 1380).

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 1334/1374 and a shared L2 cache unit 1376, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture

Figure 14B:
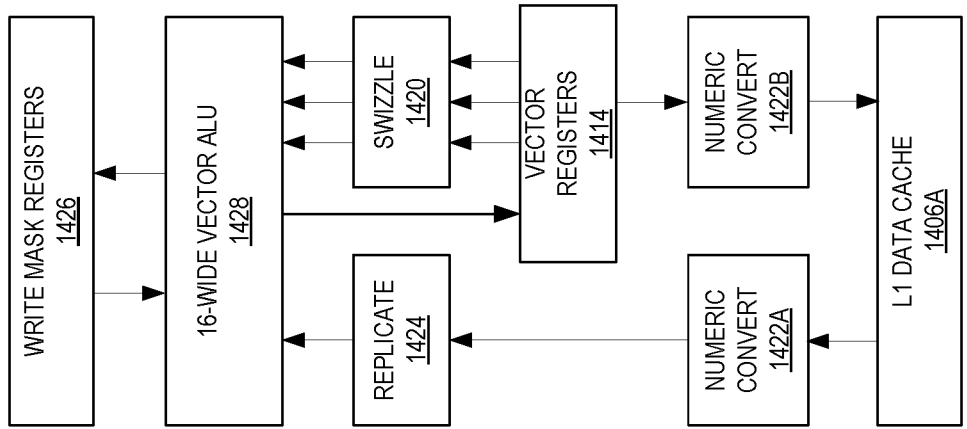
FIG. 14B is an expanded view of part of the processor core in FIG. 14A according to examples of the disclosure.
Figure 14A:
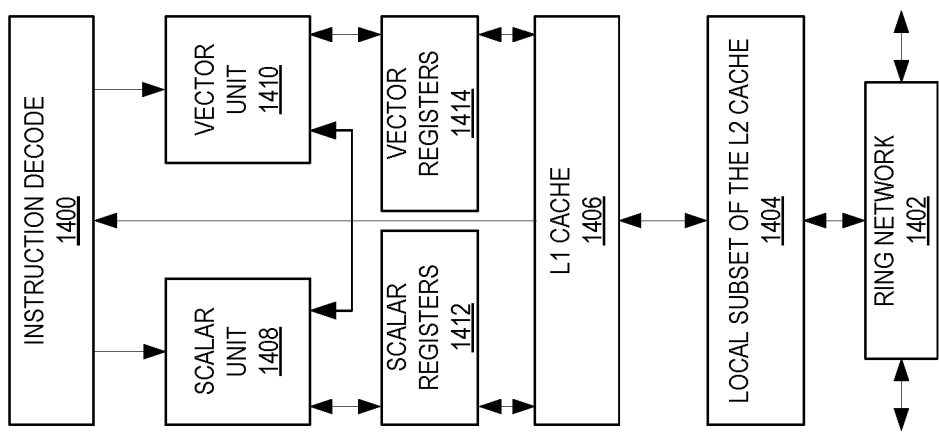
FIG. 14A is a block diagram of a single processor core, along with its connection to the on-die interconnect network and with its local subset of the Level 2 (L2) cache, according to examples of the disclosure.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to examples of the disclosure. In one example, an instruction decode unit 1400 supports the x86 instruction set with a packed data instruction set extension. An L1 cache 1406 allows low-latency accesses to cache memory into the scalar and vector units. While in one example (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative examples of the disclosure may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to examples of the disclosure. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
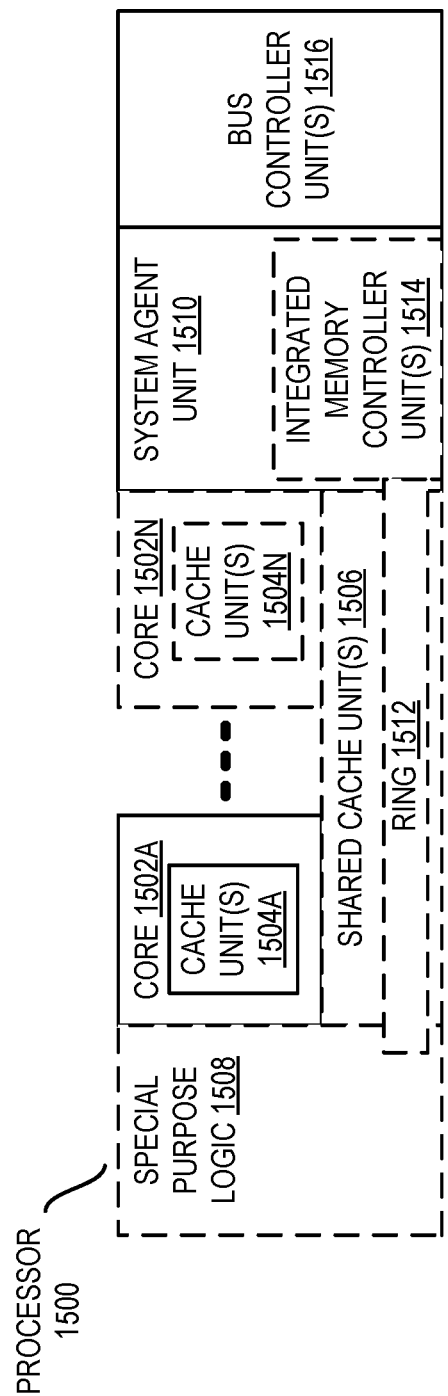
FIG. 15 is a block diagram of a processor that may have more than one core, may have an integrated memory controller, and may have integrated graphics according to examples of the disclosure.

FIG. 15 is a block diagram of a processor 1500 that may have more than one core, may have an integrated memory controller, and may have integrated graphics according to examples of the disclosure. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one example a ring based interconnect unit 1512 interconnects the integrated graphics logic 1508, the set of shared cache units 1506, and the system agent unit 1510/integrated memory controller unit(s) 1514, alternative examples may use any number of well-known techniques for interconnecting such units. In one example, coherency is maintained between one or more cache units 1506 and cores 1502-A-N.

In some examples, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
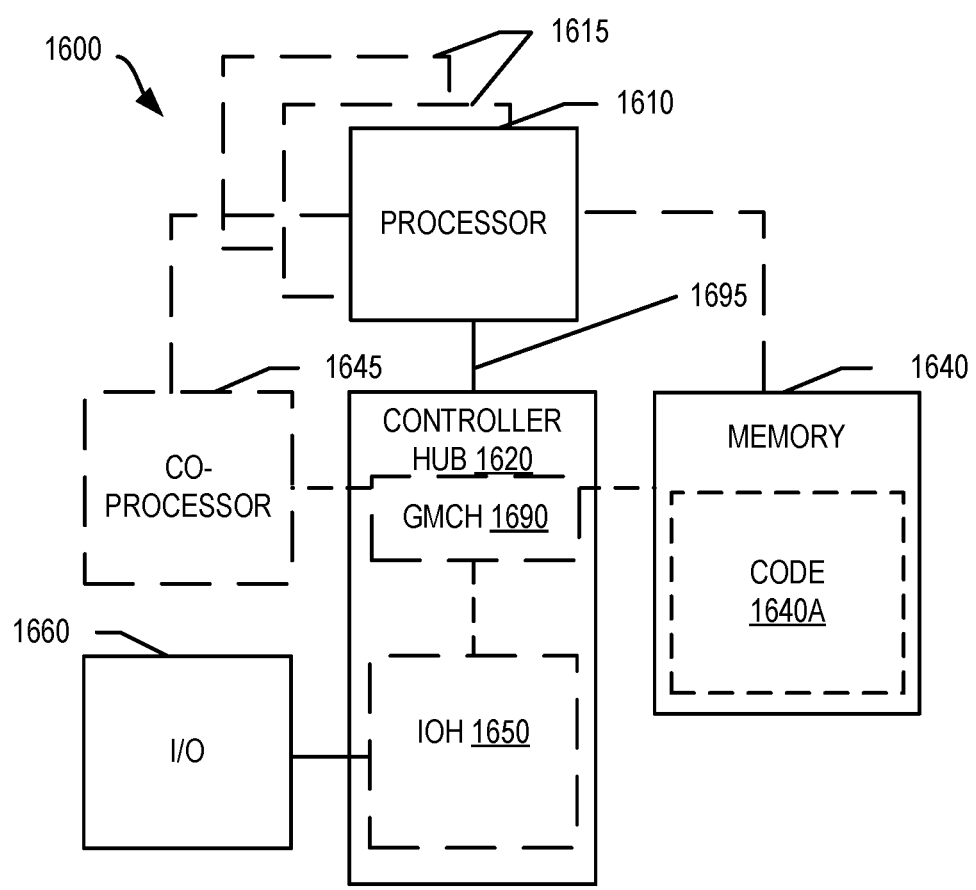
FIG. 16 is a block diagram of a system in accordance with one example of the present disclosure.

Referring now to FIG. 16, shown is a block diagram of a system 1600 in accordance with one example of the present disclosure. The system 1600 may include one or more processors 1610, 1615, which are coupled to a controller hub 1620. In one example the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650. Memory 1640 may include code 1640A, for example, to store code that when executed causes a processor to perform any method of this disclosure.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one example, the controller hub 1620 communicates with the processor(s) 1610, 1615 via a multi-drop bus, such as a frontside bus (FSB), point-to-point interface such as Quickpath Interconnect (QPI), or similar connection 1695.

In one example, the coprocessor 1645 is a special-purpose processor, such as, for example, a high-throughput MIC processor, a network or communication processor, compression engine, graphics processor, GPGPU, embedded processor, or the like. In one example, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one example, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
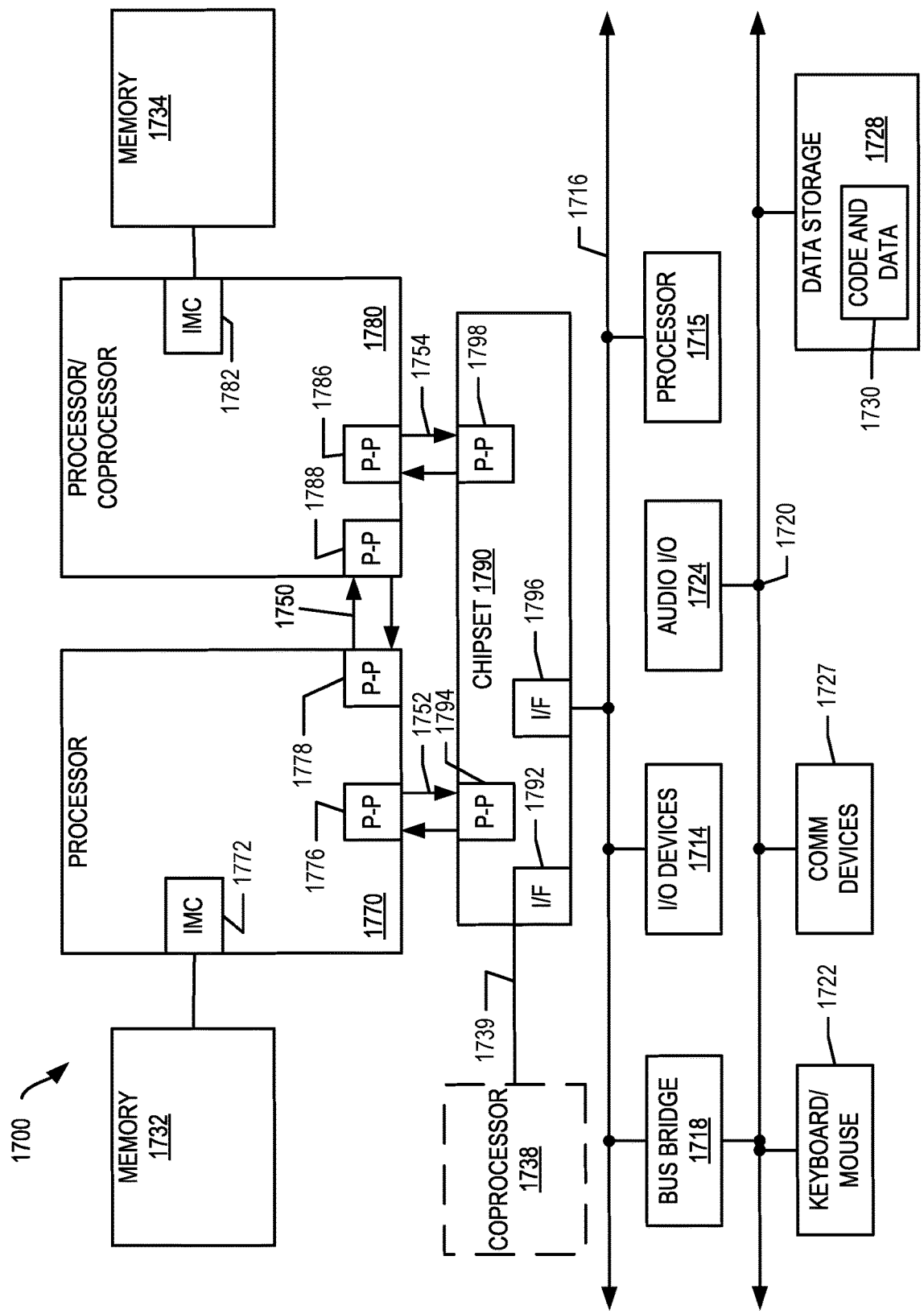
FIG. 17 is a block diagram of a more specific exemplary system in accordance with an example of the present disclosure.

Referring now to FIG. 17, shown is a block diagram of a first more specific exemplary system 1700 in accordance with an example of the present disclosure. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one example of the disclosure, processors 1770 and 1780 are respectively processors 1610 and 1615, while coprocessor 1738 is coprocessor 1645. In another example, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one example, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one example, first bus 1716 may be a Peripheral Component Interconnect (PCI) bus, or a bus such as a PCI Express bus or another third generation I/O interconnect bus, although the scope of the present disclosure is not so limited.

As shown in FIG. 17, various I/O devices 1714 may be coupled to first bus 1716, along with a bus bridge 1718 which couples first bus 1716 to a second bus 1720. In one example, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one example, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one example. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
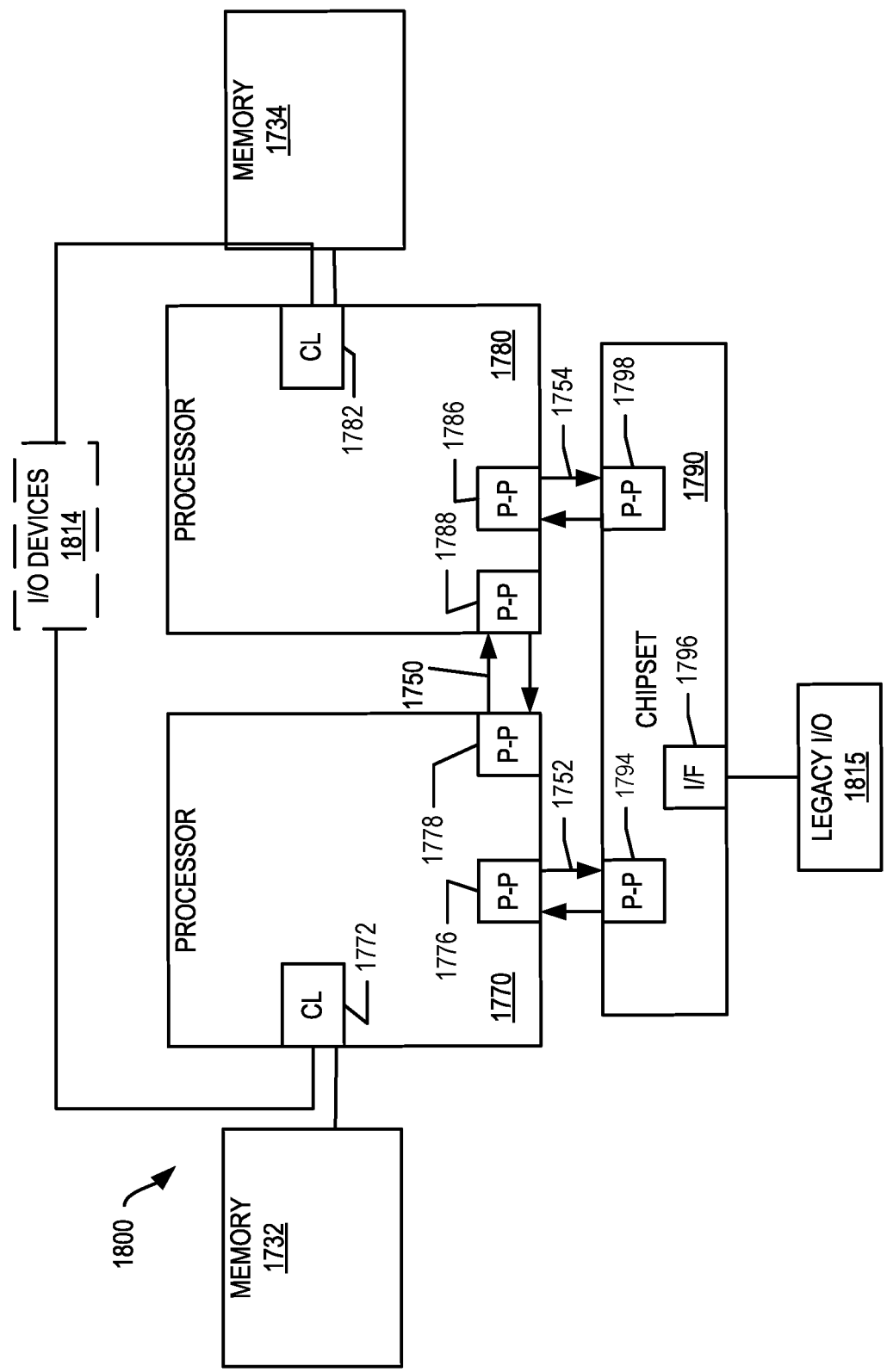
FIG. 18, shown is a block diagram of a second more specific exemplary system in accordance with an example of the present disclosure.

Referring now to FIG. 18, shown is a block diagram of a second more specific exemplary system 1800 in accordance with an example of the present disclosure. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
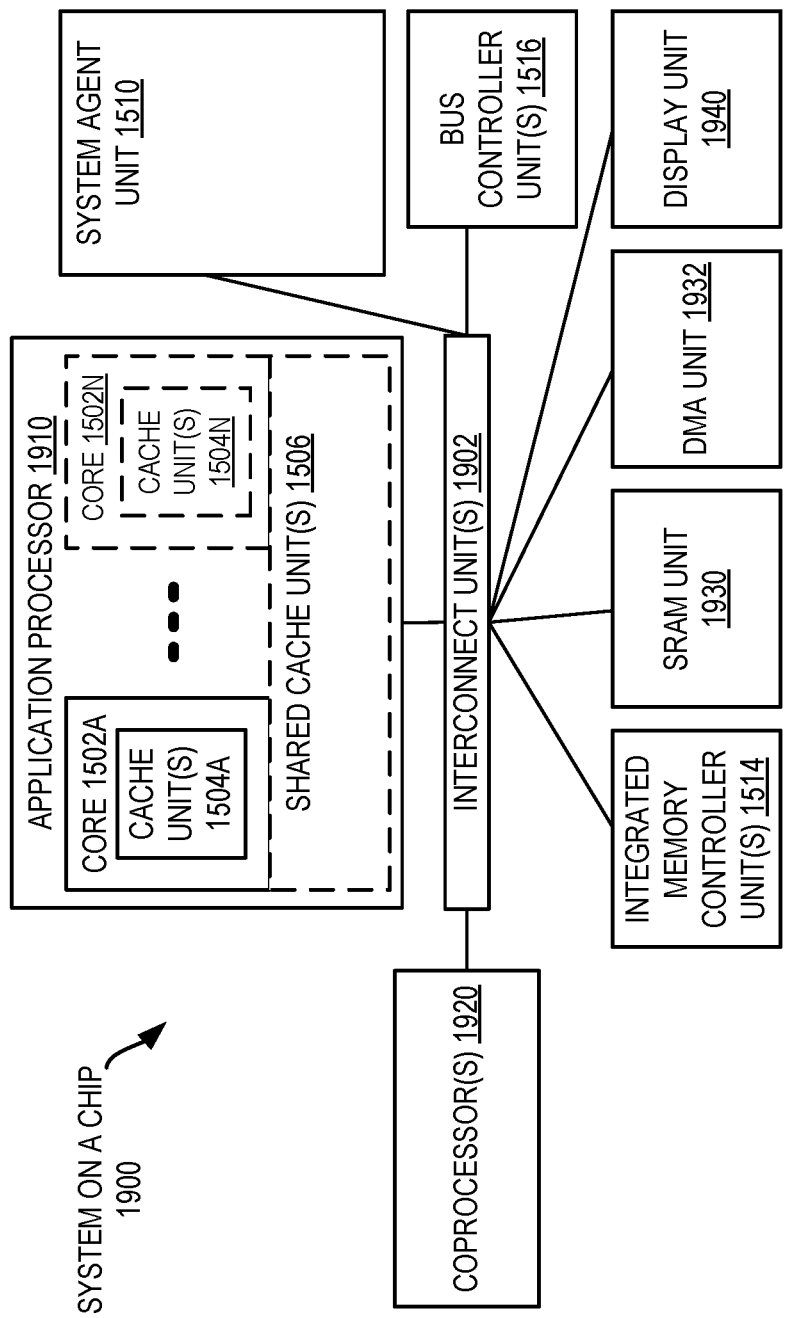
FIG. 19, shown is a block diagram of a system on a chip (SoC) in accordance with an example of the present disclosure.

Referring now to FIG. 19, shown is a block diagram of a SoC 1900 in accordance with an example of the present disclosure. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one example, the coprocessor(s) 1920 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
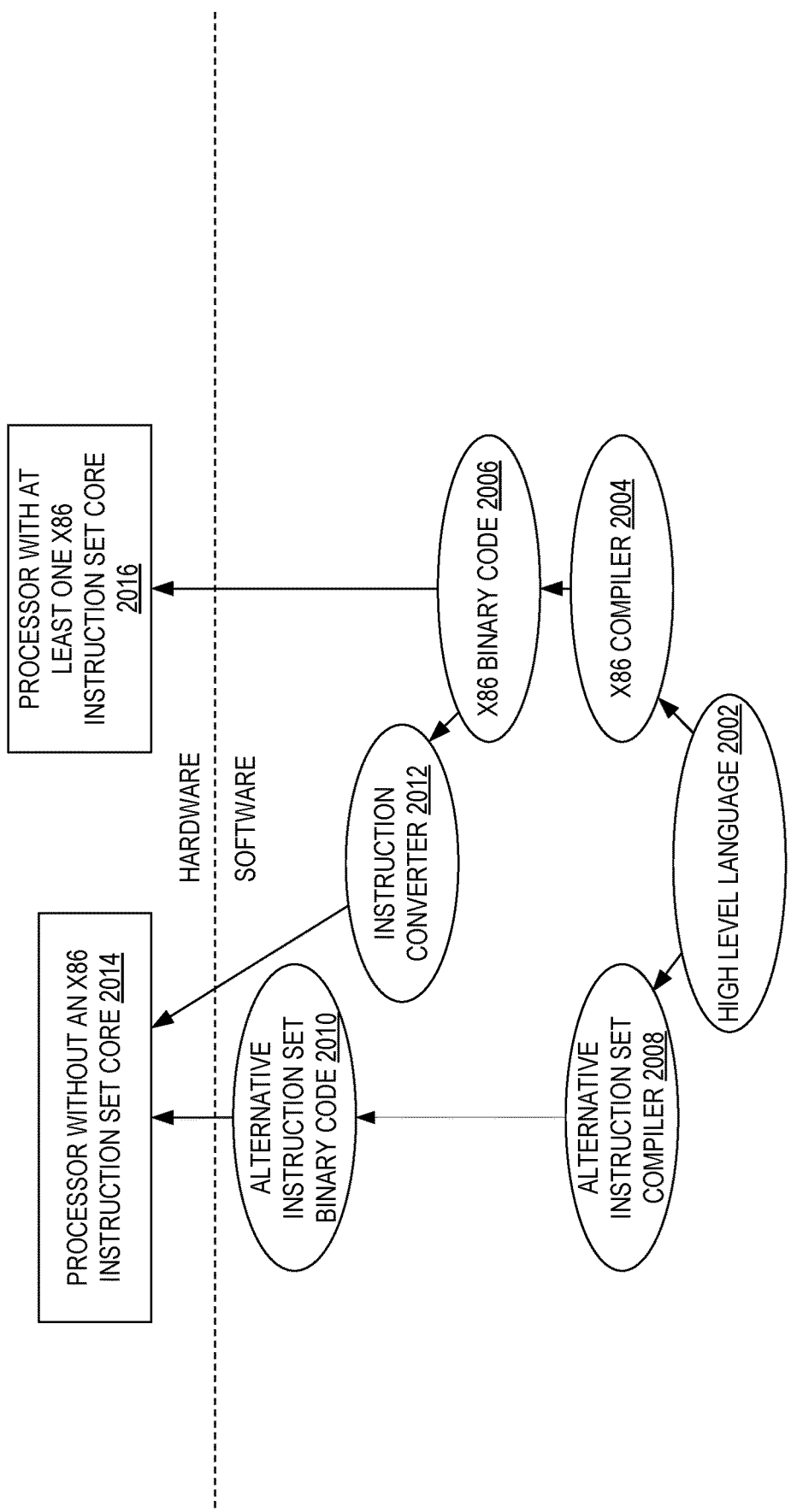
FIG. 20 is a block diagram contrasting the use of a software instruction converter to convert binary instructions in a source instruction set to binary instructions in a target instruction set according to examples of the disclosure.

FIG. 20 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, CA and/or that execute the ARM instruction set of ARM Holdings of Sunnyvale, CA). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

What is claimed is:

1. An apparatus comprising:
   an execution circuit to execute an instruction that generates a memory access request for an element in memory via a first capability;
   a capability management circuit to check the first capability for the memory access request, the first capability comprising an address field of the element in the memory, a validity field, and a bounds field that is to indicate a lower bound and an upper bound of a first object to which the first capability authorizes access;
a cache; and
a prefetch circuit to:
prefetch an additional element of the first object from the memory based on the first capability checked by the capability management circuit,
determine if the additional element is a second capability comprising an address field of a second element in the memory, a validity field, and a bounds field that is to indicate a lower bound and an upper bound of a second object to which the second capability authorizes access, and
prefetch the second element from the memory to the cache based on the additional element being the second capability.

2. The apparatus of claim 1, wherein the prefetch circuit is to prefetch the additional element of the first object from the memory to the cache based on the first capability.

3. The apparatus of claim 1, wherein the prefetch circuit is to cause a prefetch of one or more further elements of the second object from the memory to the cache based on the one or more further elements being within the lower bound and the upper bound indicated by the second capability.

4. The apparatus of claim 3, wherein the one or more further elements of the second object are a plurality of further elements of the second object within the lower bound and the upper bound indicated by the second capability.

5. The apparatus of claim 3, wherein the prefetch circuit comprises a plurality of prefetch circuits, and the plurality of prefetch circuits are to prefetch the second element from the memory to the cache in parallel with the prefetch of the one or more further elements of the second object from the memory to the cache.

6. The apparatus of claim 1, wherein the prefetch circuit is to:
prefetch a second additional element of the first object from the memory based on the first capability,
determine if the second additional element is a third capability comprising an address field of a third element in the memory, a validity field, and a bounds field that is to indicate a lower bound and an upper bound of a third object to which the third capability authorizes access, and
prefetch the third element from the memory to the cache based on the second additional element being the third capability.

7. The apparatus of claim 6, wherein the prefetch circuit is to cause a prefetch of one or more further elements of the third object from the memory to the cache based on the one or more further elements being within the lower bound and the upper bound indicated by the third capability.

8. The apparatus of claim 1, wherein the prefetch circuit is to prefetch the additional element of the first object from the memory based on the additional element being within the lower bound and the upper bound of the first object indicated by the first capability.

9. A method comprising:
executing, by an execution circuit of a processor, an instruction that generates a memory access request for an element in memory via a first capability;
checking, by a capability management circuit of the processor, the first capability for the memory access request, the first capability comprising an address field of the element in the memory, a validity field, and a bounds field that is to indicate a lower bound and an upper bound of a first object to which the first capability authorizes access;
prefetching, by a prefetch circuit of the processor, an additional element of the first object from the memory based on the first capability checked by the capability management circuit;
determining, by the processor, if the additional element is a second capability comprising an address field of a second element in the memory, a validity field, and a bounds field that is to indicate a lower bound and an upper bound of a second object to which the second capability authorizes access; and
prefetching, by the prefetch circuit, the second element from the memory to a cache of the processor based on the additional element being the second capability.

10. The method of claim 9, wherein the prefetching of the additional element comprises prefetching the additional element of the first object from the memory to the cache based on the first capability.

11. The method of claim 9, further comprising prefetching, by the prefetch circuit, one or more further elements of the second object from the memory to the cache based on the one or more further elements being within the lower bound and the upper bound indicated by the second capability.

12. The method of claim 11, wherein the one or more further elements of the second object are a plurality of further elements of the second object within the lower bound and the upper bound indicated by the second capability.

13. The method of claim 11, wherein the prefetch circuit comprises a plurality of prefetch circuits, and the plurality of prefetch circuits perform the prefetching of the second element from the memory to the cache in parallel with the prefetching of the one or more further elements of the second object from the memory to the cache.

14. The method of claim 9, further comprising:
prefetching, by the prefetch circuit, a second additional element of the first object from the memory based on the first capability;
determining, by the processor, if the second additional element is a third capability comprising an address field of a third element in the memory, a validity field, and a bounds field that is to indicate a lower bound and an upper bound of a third object to which the third capability authorizes access; and
prefetching, by the prefetch circuit, the third element from the memory to the cache based on the second additional element being the third capability.

15. The method of claim 14, further comprising prefetching, by the prefetch circuit, one or more further elements of the third object from the memory to the cache based on the one or more further elements being within the lower bound and the upper bound indicated by the third capability.

16. The method of claim 9, wherein the prefetching of the additional element of the first object from the memory is based on the additional element being within the lower bound and the upper bound of the first object indicated by the first capability.

17. A system comprising:
a memory;
a processor comprising:
an execution circuit to execute an instruction that generates a memory access request for an element in the memory via a first capability, and
a cache separate from the memory;
a capability management circuit to check the first capability for the memory access request, the first capability comprising an address field of the element in the memory, a validity field, and a bounds field that is to indicate a lower bound and an upper bound of a first object to which the first capability authorizes access; and a prefetch circuit to:
prefetch an additional element of the first object from the memory based on the first capability checked by the capability management circuit,
determine if the additional element is a second capability comprising an address field of a second element in the memory, a validity field, and a bounds field that is to indicate a lower bound and an upper bound of a second object to which the second capability authorizes access, and
prefetch the second element from the memory to the cache based on the additional element being the second capability.

18. The system of claim 17, wherein the prefetch circuit is to prefetch the additional element of the first object from the memory to the cache based on the first capability.

19. The system of claim 17, wherein the prefetch circuit is to cause a prefetch of one or more further elements of the second object from the memory to the cache based on the one or more further elements being within the lower bound and the upper bound indicated by the second capability.

20. The system of claim 19, wherein the one or more further elements of the second object are a plurality of further elements of the second object within the lower bound and the upper bound indicated by the second capability.

21. The system of claim 19, wherein the prefetch circuit comprises a plurality of prefetch circuits, and the plurality of prefetch circuits are to prefetch the second element from the memory to the cache in parallel with the prefetch of the one or more further elements of the second object from the memory to the cache.

22. The system of claim 17, wherein the prefetch circuit is to:
prefetch a second additional element of the first object from the memory based on the first capability,
determine if the second additional element is a third capability comprising an address field of a third element in the memory, a validity field, and a bounds field that is to indicate a lower bound and an upper bound of a third object to which the third capability authorizes access, and
prefetch the third element from the memory to the cache based on the second additional element being the third capability.

23. The system of claim 22, wherein the prefetch circuit is to cause a prefetch of one or more further elements of the third object from the memory to the cache based on the one or more further elements being within the lower bound and the upper bound indicated by the third capability.

24. The system of claim 17, wherein the prefetch circuit is to prefetch the additional element of the first object from the memory based on the additional element being within the lower bound and the upper bound of the first object indicated by the first capability.

* * * * *